(12) United States Patent
Hitaka et al.

(10) Patent No.: US 11,316,984 B2
(45) Date of Patent: Apr. 26, 2022

(54) IMAGE FORMING DEVICE AND IMAGE FORMING DEVICE DIAGNOSTIC SYSTEM

(71) Applicant: Konica Minolta, Inc., Tokyo (JP)

(72) Inventors: Masatoshi Hitaka, Toyokawa (JP); Yasufumi Naitou, Toyokawa (JP)

(73) Assignee: Konica Minolta, Inc., Tokyo (JP)

(*) Notice: Subject to any disclaimer, the term of this patent is extended or adjusted under 35 U.S.C. 154(b) by 0 days.

(21) Appl. No.: 17/010,718

(22) Filed: Sep. 2, 2020

(65) Prior Publication Data

US 2021/0084175 A1 Mar. 18, 2021

(30) Foreign Application Priority Data

Sep. 13, 2019 (JP) .............................. JP2019-167435

(51) Int. Cl.
*H04N 1/00* (2006.01)
*G06F 3/12* (2006.01)
*G06K 15/02* (2006.01)

(52) U.S. Cl.
CPC ....... *H04N 1/00029* (2013.01); *H04N 1/0009* (2013.01); *H04N 1/00061* (2013.01);
(Continued)

(58) Field of Classification Search
None
See application file for complete search history.

(56) References Cited

U.S. PATENT DOCUMENTS

| 4,937,622 A * | 6/1990 | Makiura | G03G 15/70 |
| | | | 271/259 |
| 5,138,376 A * | 8/1992 | Maruta | G03G 15/50 |
| | | | 399/9 |

(Continued)

FOREIGN PATENT DOCUMENTS

| JP | 60159868 | * | 8/1985 | ............. G03G 15/00 |
| JP | 2006-030258 A | | 2/2006 | |

(Continued)

OTHER PUBLICATIONS

Y. Xu, Y. Peng and S. Liu, "Application of NB-IoT Technology in Internet of Things Label Printer," 2018 Chinese Automation Congress (CAC), 2018, pp. 1223-1228, doi: 10.1109/CAC.2018. 8623108. (Year: 2018).*

(Continued)

*Primary Examiner* — Beniyam Menberu
(74) *Attorney, Agent, or Firm* — Squire Patton Boggs (US) LLP

(57) ABSTRACT

An image forming device including an image former, a primary controller, a secondary controller, one or more sensors, an interface, and a writer. The image former executes image forming processing to form an image on a sheet. The primary controller instructs the secondary controller to control the image former to execute the image forming processing. Each sensor detects a state of the image former and outputs sensor data to the secondary controller. The interface can be connected to a storage medium. The secondary controller generates diagnostic data based on the sensor data. The writer writes the diagnostic data to the storage medium via the interface. The diagnostic data is used by a diagnostic server to perform failure diagnostics and life prediction pertaining to the image forming device, after transfer to the diagnostic server via a transfer device when the storage medium is mounted to the transfer device.

22 Claims, 26 Drawing Sheets

(52) U.S. Cl.
CPC ..... *H04N 1/00079* (2013.01); *H04N 1/00323* (2013.01); *H04N 1/00689* (2013.01); *H04N 2201/0094* (2013.01)

(56) References Cited

U.S. PATENT DOCUMENTS

| | | | | |
|---|---|---|---|---|
| 5,805,932 | A * | 9/1998 | Kawashima | H03M 7/48 360/48 |
| 10,257,382 | B2 | 4/2019 | Yasunaga | |
| 2003/0138257 | A1 * | 7/2003 | DiRubio | G03G 15/55 399/9 |
| 2005/0027486 | A1 * | 2/2005 | Kitada | H04L 41/08 702/185 |
| 2005/0030562 | A1 | 2/2005 | Hama et al. | |
| 2005/0254564 | A1 | 11/2005 | Tsutsui | |
| 2005/0254864 | A1 | 11/2005 | Koide | |
| 2007/0174601 | A1 | 7/2007 | Douglas et al. | |
| 2008/0075476 | A1 * | 3/2008 | Nakazato | G03G 15/55 399/15 |
| 2008/0199193 | A1 * | 8/2008 | Nakazato | G03G 15/01 399/49 |
| 2009/0316173 | A1 | 12/2009 | Tanaka et al. | |
| 2010/0058123 | A1 * | 3/2010 | Yamashirodani | H04N 1/32641 714/57 |
| 2010/0088541 | A1 * | 4/2010 | Tanaka | G06F 11/3476 714/6.12 |
| 2011/0231712 | A1 * | 9/2011 | Hirata | G06F 11/0781 714/49 |
| 2012/0069398 | A1 | 3/2012 | Nemoto | |
| 2012/0331279 | A1 * | 12/2012 | Matsubara | G06F 9/4403 713/1 |
| 2014/0078552 | A1 | 3/2014 | Wang | |
| 2014/0153938 | A1 * | 6/2014 | Saito | G03G 15/2053 399/33 |
| 2014/0307278 | A1 | 10/2014 | Kinoda et al. | |
| 2014/0358487 | A1 * | 12/2014 | Shin | G05B 23/0221 702/190 |
| 2015/0150096 | A1 * | 5/2015 | Yamaguchi | G06F 21/34 726/4 |
| 2016/0352935 | A1 * | 12/2016 | Hirama | H04N 1/00344 |
| 2017/0212001 | A1 * | 7/2017 | Kamezaki | G01L 23/08 |
| 2018/0173148 | A1 | 6/2018 | Etou | |
| 2019/0056899 | A1 | 2/2019 | Fukuoka et al. | |

FOREIGN PATENT DOCUMENTS

| | | |
|---|---|---|
| JP | 2008-009854 A | 1/2008 |
| JP | 2015-094919 A | 5/2015 |
| JP | 2016-110706 A | 6/2016 |
| JP | 2017-216654 A | 12/2017 |
| JP | 2018-092593 A | 6/2018 |

OTHER PUBLICATIONS

Office Action for U.S. Appl. No. 17/023,803 dated Oct. 8, 2021, 17 pages.

Non-Final Office Action for U.S. Appl. No. 17/023,803 dated Jun. 3, 2021, 15 pages.

* cited by examiner

FIG. 7A

Example of diagnostic data

| Image forming device #1 | | | | | |
|---|---|---|---|---|---|
| Time written | Sheet arrival time(ms) | Tray | Size | Sheet type | Sheet feed speed |
| 2018/5/10/10:00:00 | 250 | Tray 1 | A4L | Plain paper | Speed 1 |
| 2018/5/10/10:00:01 | 251 | Tray 1 | A4L | Plain paper | Speed 1 |
| 2018/5/10/10:00:02 | 250 | Tray 1 | A4L | Plain paper | Speed 1 |
| 2018/5/10/10:00:03 | 270 | Tray 1 | A4L | Plain paper | Speed 1 |
| 2018/5/10/10:00:06 | 250 | Tray 1 | A4L | Plain paper | Speed 1 |
| ... | ... | ... | ... | ... | ... |
| 2018/12/01/15:00:10 | 260 | Tray 1 | A4L | Plain paper | Speed 1 |

FIG. 7B

Example of data stored in image forming device 100

ID00009900: 20180510100000, 0250, 01, 01, 01, 01
ID00009900: 20180510100001, 0251, 01, 01, 01, 01
ID00009900: 20180510100002, 0250, 01, 01, 01, 01
ID00009900: 20180510100003, 0270, 01, 01, 01, 01    ⇐ Sensor data indicating unexpected slowdown
ID00009900: 20180510100006, 0250, 01, 01, 01, 01
...
ID00009900: 20181201150010, 0260, 01, 01, 01, 01    ⇐ Latest data

FIG. 7C

Example of data stored in diagnostic server 101

Example of diagnostic data

Power-ON: ID0009900
Start: Tray 1, A4L, Plain, Speed 1
2018/05/10/10:00:00, 250ms
2018/05/10/10:00:01, 251ms
2018/05/10/10:00:02, 250ms
2018/05/10/10:00:03, 270ms
2018/05/10/10:00:06, 250ms
...

Power-ON: ID0009900
Start: Tray 2, A3S, Plain, Speed 1
2018/08/10/10:00:00, 250ms
Start: Tray 1, A4L, Plain, Speed 1
2018/08/10/10:00:20, 250ms
...

Start: Tray 1, A4L, Plain, Speed 1
2018/12/01/15:00:10, 260ms

FIG. 14B

Example of diagnostic data after conversion

ID00009900: 20181201150011, 0260, 01, 01, 01, 01  ⇐ Start address
ID00009900: 20181201150012, 0260, 01, 01, 01, 01  ⇐ Latest data
                    END
ID00009900: 20180510100000, 0250, 01, 01, 01, 01
ID00009900: 20180510100001, 0251, 01, 01, 01, 01
ID00009900: 20180510100002, 0250, 01, 01, 01, 01
ID00009900: 20180510100003, 0270, 01, 01, 01, 01
ID00009900: 20180510100006, 0250, 01, 01, 01, 01
                    ...
ID00009900: 20181201150010, 0260, 01, 01, 01, 01  ⇐ End address

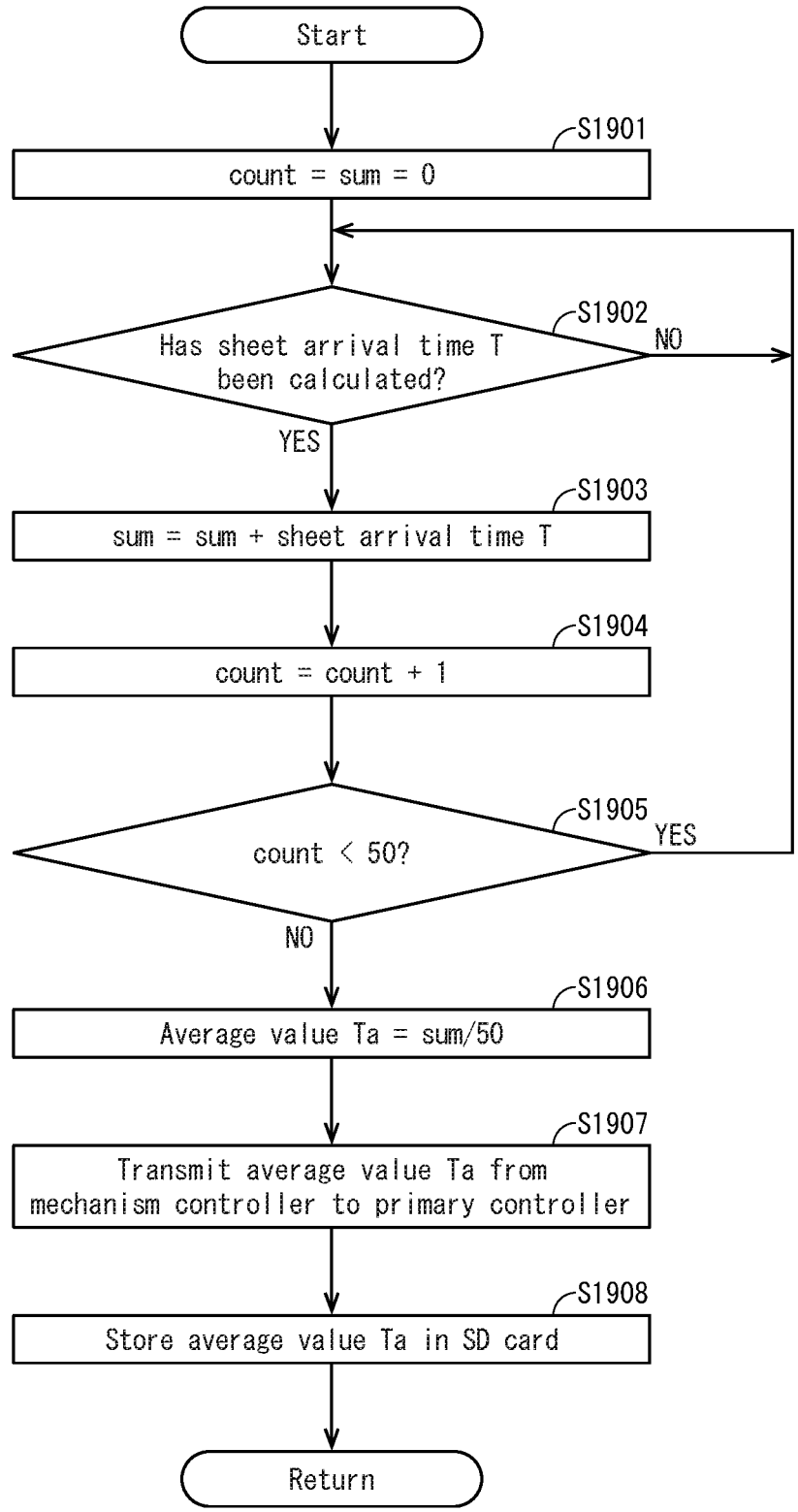

FIG. 20A

Example of diagnostic data

| count | Sheet arrival time T (ms) |
|---|---|
| 1 | 262 |
| 2 | 262 |
| 3 | 260 |
| ... | ... |
| 50 | 260 |
| Average value Ta (ms) | 261.3 |

FIG. 20B

Example of stored data in SD card

| Time written | Sheet arrival time T (ms) | Tray | Size | Sheet type | Sheet feed speed |
|---|---|---|---|---|---|
| 2018/5/10/10:00:02 | 250.0 | Tray 1 | A4L | Plain paper | Speed 1 |
| 2018/5/10/10:00:21 | 251.1 | Tray 1 | A4L | Plain paper | Speed 1 |
| 2018/5/10/10:00:52 | 250.3 | Tray 1 | A4L | Plain paper | Speed 1 |
| ... | ... | ... | ... | ... | ... |
| 2018/12/01/15:00:10 | 261.3 | Tray 1 | A4L | Plain paper | Speed 1 |

FIG. 22A

Example of diagnostic data

| count | Sheet arrival time T (ms) |
|---|---|
| 1 | 262 |
| 2 | 262 |
| 3 | 260 |
| ... | ... |
| 50 | 260 |
| Maximum value Tmax (ms) | 262 |

FIG. 22B

Example of stored data in SD card

| Time written | Sheet arrival time T (ms) | Tray | Size | Sheet type | Sheet feed speed |
|---|---|---|---|---|---|
| 2018/5/10/10:00:02 | 250 | Tray 1 | A4L | Plain paper | Speed 1 |
| 2018/5/10/10:00:21 | 251 | Tray 1 | A4L | Plain paper | Speed 1 |
| 2018/5/10/10:00:52 | 250 | Tray 1 | A4L | Plain paper | Speed 1 |
| ... | ... | ... | ... | ... | ... |
| 2018/12/01/15:00:10 | 261 | Tray 1 | A4L | Plain paper | Speed 1 |

FIG. 26A

Example of IDs

| count | Sheet arrival time T (ms) | ID |
|---|---|---|
| 1 | 262 | 1 |
| 2 | 262 | 1 |
| ... | ... | ... |
| 50 | 260 | 1 |
| Average value Ta | 261.3 | 1 |
| 1 | 262 | 2 |
| 2 | 262 | 2 |
| ... | ... | ... |
| 50 | 260 | 2 |
| Average value Ta | 261.3 | 2 |

FIG. 26B

Example of diagnostic data stored in SD card 120

| Sheet arrival time T (ms) | Number of sheet arrival times | ID |
|---|---|---|
| 260 | 1 | 2 |

FIG. 26C

Example of diagnostic data transmitted to diagnostic server 101

| Average value Ta (ms) | Number of sheet arrival times | ID |
|---|---|---|
| 261.3 | 50 | 2 |

FIG. 26D

Example of stored data and transmitted data

| Time received/ Time written | Image forming device #1 | | | | | |
|---|---|---|---|---|---|---|
| | Stored in SD card | | | Transmitted to diagnostic server | | |
| | Sheet arrival time T (ms) | Number of sheet arrival times | ID | Average value Ta (ms) | Number of sheet arrival times | ID |
| 2018/5/10/10:00:02 | 250 | 1 | 1 | – | – | – |
| 2018/5/10/10:00:21 | 251 | 1 | 1 | – | – | – |
| 2018/5/10/10:00:52 | 250 | 1 | 1 | – | – | – |
| ... | ... | ... | ... | ... | ... | ... |
| 2018/12/01/15:00:09 | 261 | 1 | 2 | – | – | – |
| 2018/12/01/15:00:10 | 260 | 1 | 2 | – | – | – |
| 2018/12/01/15:00:10 | – | – | – | 261.3 | 50 | 2 |

…

IMAGE FORMING DEVICE AND IMAGE FORMING DEVICE DIAGNOSTIC SYSTEM

This application claims priority to Japanese patent Application No. 2019-167435, filed on Sep. 13, 2019, the contents of which are hereby incorporated herein by reference in their entirety.

BACKGROUND

(1) Technical Field

The present disclosure relates to image forming devices and image forming device diagnostic systems, and in particular to techniques for increasing diagnostic data acquisition frequency in order to improve image forming device diagnostic accuracy.

(2) Description of the Related Art

Conventionally, a system exists that remotely executes failure diagnostics and life prediction with respect to an image forming device by using a diagnostic server. The image forming device includes a mechanism controller (secondary controller) that controls mechanisms for executing image forming processing and a primary controller that receives a job from a user then causes the mechanism controller to execute the control of mechanisms. The mechanism controller references output from various sensors and the primary controller sends acquired sensor data to a diagnostic server. The diagnostic server uses the sensor data to perform failure diagnostics and life prediction.

A communication path for transmitting the sensor data from the mechanism controller to the primary controller is also used for transmitting operation instructions, modes, and the like from the primary controller to the mechanism controller. In recent years, there is a demand for such applications to have real-time properties, and therefore delay of operation instructions, modes, and the like from the controller to the mechanism controller cannot be allowed. However if an amount of transmitted sensor data is too large, there is a risk of delay in communication of operation instructions, modes, and the like.

For example, if 200 bytes of data are sent and received between the primary controller and the mechanism controller each time an image is formed, and a user of the image forming device prints 1,000 sheets per day, 200 kilobytes of data are sent and received per day. If 3,000 sheets are printed per day, an amount of sent and received data is tripled to 600 kilobytes per day.

Further, such data is not sent and received evenly over 24 hours, but is often sent and received during a specific period of time, and a communication load between the primary controller and the mechanism controller is high during such a period of time.

Thus, if sensor data is frequently transmitted also using the communication path for transmitting and receiving image forming data, depending on the time period, communication for image forming processing might be delayed, leading to the image forming processing being delayed, and even to a decrease in image quality.

In response to such a problem, for example, an average value, maximum value, and minimum value of sensor data can be obtained by the mechanism controller and only the average value or the like is transmitted to the primary controller, thereby suppressing an amount of transmitted sensor data. Accordingly, communication for other purposes can be smoothly executed without delay.

However, when a number of sensor data samples used to obtain an average value is increased, a sample value used when an unexpected change occurs may be buried in normal sample values and therefore difficult to recognize. Further, maximum and minimum values are obtained for each time period of some length, and therefore although it is possible to send data values to the diagnostic server when an unexpected change in sensor data occurs, sufficient information is not conveyed for when the unexpected change occurred or how many times unexpected changes occurred. Thus, when average values or the like are used, there is inevitably a limit to improvement of accuracy of failure diagnostics and life prediction by a diagnostic server.

However, if all sensor data is transmitted to the diagnostic server, there is a risk of hindering communication for other purposes such as operation instructions and mode changes when image forming. Further, there is a risk that other processing by the primary controller may be delayed if a processing load for receiving all sensor data from the mechanism controller and transmitting it to the diagnostic server becomes excessive.

Further, if the image forming device cannot be connected to a diagnostic server connected to an external network due to a limitation of communication capacity or security restriction, the image forming device cannot transmit sensor data to the diagnostic server in the first place, and therefore the diagnostic server cannot use the sensor data to perform failure diagnostics and life prediction.

SUMMARY

The present disclosure is made in view of the above, and an object of the present disclosure is to provide an image forming device and an image forming device diagnostic system that can improve failure diagnostics and life prediction even when sensor data cannot be transmitted from the image forming device to a diagnostic server.

In order to achieve at least the above object, an image forming device reflecting one aspect of the present disclosure is an image forming device including an image former, a primary controller, a secondary controller, one or more sensors, an interface, and a writer. The image former executes image forming processing to form an image on a sheet. The primary controller instructs the secondary controller to control the image former to execute the image forming processing. Each sensor of the one or more sensors detects a state of the image former and outputs sensor data indicating the state to the secondary controller. The interface can be connected to a storage medium. The secondary controller generates diagnostic data based on the sensor data. The writer writes the diagnostic data to the storage medium when the storage medium is connected to the interface. The diagnostic data is used by a diagnostic server to perform failure diagnostics and life prediction pertaining to the image forming device, after transfer to the diagnostic server via a transfer device when the storage medium is mounted to the transfer device.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the invention. In the drawings:

FIG. 7A is a table illustrating sheet arrival times T as diagnostic data, FIG. 7B illustrates accumulated data of the image forming device 100, and FIG. 7C illustrates accumulated data of the diagnostic server 101;

FIG. 8 illustrates accumulated data of the diagnostic server 101 after transfer of accumulated data of the image forming device 100 to the diagnostic server 101 by using an SD card 120.

FIG. 14A illustrates a highly readable diagnostic data format, and FIG. 14B illustrates diagnostic data after conversion into a data format used by the diagnostic server 101;

FIG. 16 illustrates diagnostic data accumulated in a ring buffer format;

FIG. 19 is a flowchart for describing operations of the mechanism controller 100 pertaining to Embodiment 6;

FIG. 20A is a table illustrating sheet arrival times T and an average value Ta, and FIG. 20B is a table illustrating diagnostic data accumulated in the SD card 120;

FIG. 22A is a table illustrating sheet arrival times T and a maximum value Ta, and FIG. 22B is a table illustrating diagnostic data accumulated in the SD card 120;

FIG. 26A is a table illustrating IDs associating sheet arrival times T with average values Ta, FIG. 26B is a table illustrating diagnostic data in the SD card 120, FIG. 26C is a table illustrating diagnostic data sent to the diagnostic server 101, and FIG. 26D is a table illustrating accumulated data and transmitted data.

DETAILED DESCRIPTION

Hereinafter, one or more embodiments of the present invention will be described with reference to the drawings. However, the scope of the invention is not limited to the disclosed embodiments.

The following describes embodiments of an image forming device and an image forming device diagnostic system pertaining to the present disclosure, with reference to the drawings.

[1] Embodiment 1

The following is a description of an image forming device diagnostic system pertaining to Embodiment 1.

(1-1) Structure of Image Forming Device Diagnostic System

Structure of the image forming device diagnostic system is described below.

Figure 1:
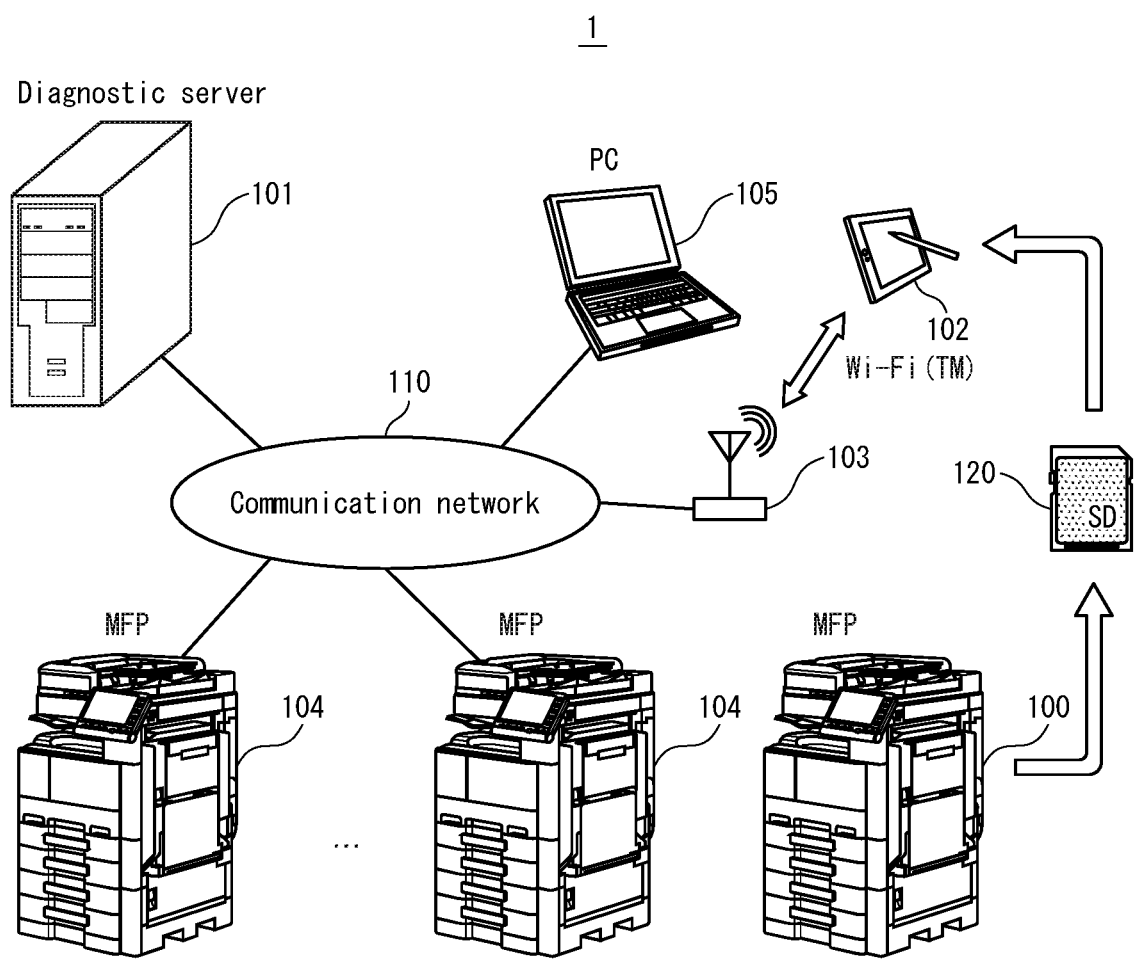
FIG. 1 is a diagram illustrating an image forming device diagnostic system according to Embodiment 1 of the present disclosure.

As illustrated in FIG. 1, the image forming device diagnostic system 1 includes an image forming device 100, a diagnostic server and image forming device management server (also referred to as "diagnostic server") 101, and tablet terminal 102. The image forming device 100 is a tandem-type color multi-function peripheral (MFP), and is provided with various sensors, and detection values of these sensors (sensor data) are stored in a Secure Digital (SD, registered trademark of SD-3C LLC) memory card (also referred to as "SD card") 120.

The tablet terminal 102 can transmit data to the diagnostic server 101 via a wireless local area network (LAN) router 103 and a communication network 110 by Wi-Fi (registered trademark) communication. The communication network 110 may be a LAN, and may be a combination of LAN and the Internet. An image forming device 104 and a personal computer (PC) 105 are also connected to the communication network 110. Upon receiving a job such as a print job from the PC 105, the image forming device 104 executes the job.

The diagnostic server 101 uses sensor data of the image forming device 100 to perform failure diagnostics for identifying failure locations and life prediction for components of the image forming device 100. If sensor data is analyzed and analysis results are fed back to an algorithm for failure diagnostics and life prediction, diagnostic control and prediction accuracy can be improved. The analysis may be automatically performed by the diagnostic server 101, and may be performed by a person.

The image forming device 100 with the SD card 120 mounted can record sensor data to the SD card 120. Further, when the SD card 120 is removed from the image forming device 100 and mounted to the tablet terminal 102, the sensor data recorded on the SD card 120 can be transmitted to the diagnostic server 101 via the wireless LAN router and the communication network 110.

(1-2) Structure of Image Forming Device 100

Structure of the image forming device 100 is described below.

Figure 2:
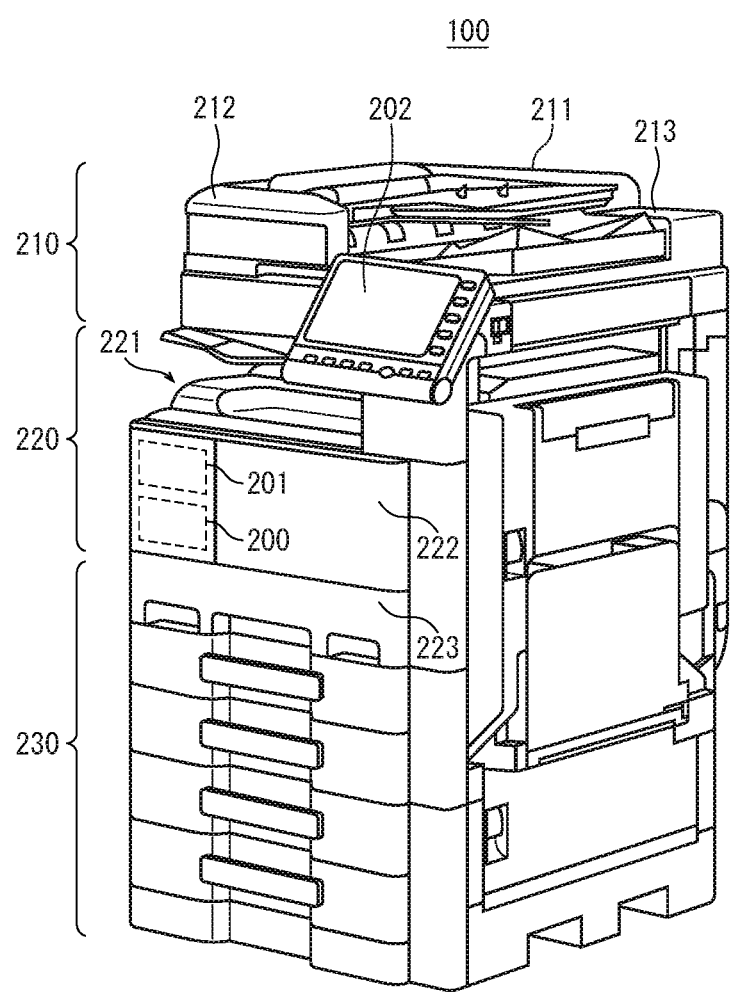
FIG. 2 is an external perspective view diagram of an image forming device 100.

As illustrated in FIG. 2, the image forming device 100 includes an image reader 210, a printer 220, and a sheet feeder 230. Further, the mechanism controller 200 and the primary controller 201 are included in the printer 220 for controlling operations of the image reader 210, the printer 220, and the sheet feeder 230. A combination of the main body 220 and the sheet feeder 230 is referred to as an image former.

When reading a document by a sheet-through scheme, the image reader 210 uses an automatic document feeder (ADF) 212 to read documents one by one from a document stack on a document tray 211, in order to generate image data. A read document is discharged onto a discharge tray 213

The primary controller 201 receives an image forming instruction from a user and instructs the mechanism controller 200 to execute the instructed image forming processing. For example, when a user gives a copy instruction, the primary controller 201 instructs the image reader 210 to read a document and generate image data, and then instructs the mechanism controller 200 to cause execution of image forming using the image data.

Upon receiving an instruction from the primary controller 201, the mechanism controller 200 controls the printer 220 and the sheet feeder 230 to execute image forming processing. The mechanism controller 200 also acquires detection values (sensor data) of various sensors in the printer 220 and the sheet feeder 230 and writes them to the SD card 120. According to the present embodiment, the sensor data is written to the SD card 120 without passing through the primary controller 201.

According to the present embodiment, the printer 220 is described as a tandem-type color printer, but the printer 220 may be a color printer of another type or a monochrome printer. Further, the number of sensors may be one or more, and there may be one or more types of sensor.

When the printer 220 executes image forming processing, the sheet feeder 230 feeds a sheet designated by a user of the image forming device 100 through a print job or an operation panel 202. According to the present embodiment, the sheet feeder 230 includes two sheet feed trays containing stacks of sheets, but the sheet feeder 230 may include one sheet feed tray, or three or more.

The printer 220 is provided with a toner cartridge (TC) door cover 222 and a front cover 223. When the toner cartridge door cover 222 is open, YMCK color toner cartridges can be installed and removed. When the front cover 223 is open, a power switch can be accessed. The toner cartridge door cover 222 and the front cover 223 are each provided with a sensor that detects the open/closed state of the cover.

(1-3) Structure of Primary Controller 201

The following describes structure of the primary controller 201.

Figure 3:
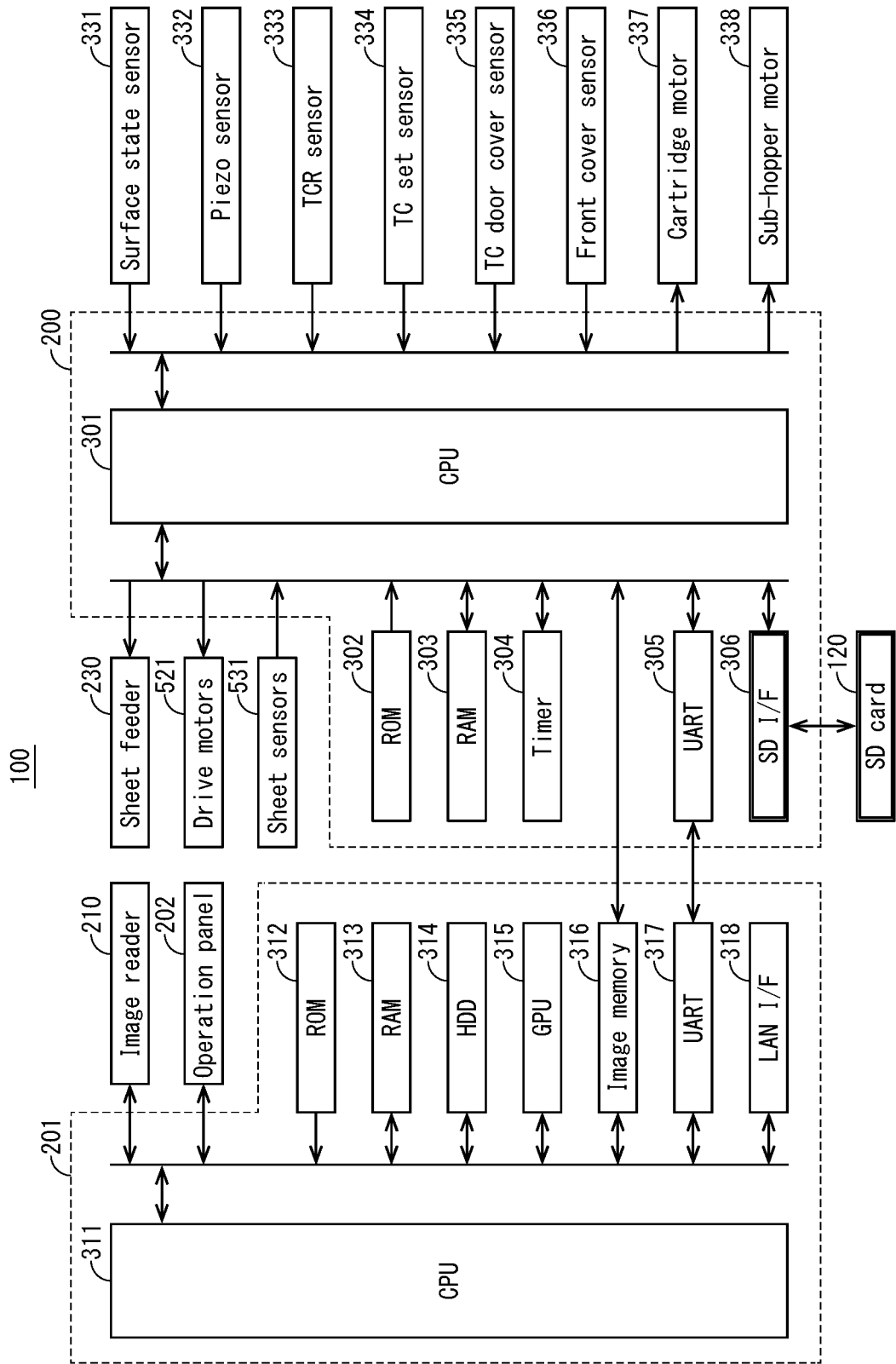
FIG. 3 is a block diagram illustrating structure of a mechanism controller 200 and a primary controller 201.

As illustrated in FIG. 3, the primary controller 201 includes a central processing unit (CPU) 311, read only memory (ROM) 312, random access memory (RAM) 313, and the like. When the CPU 311 is reset, a boot program is read from the ROM 313 and booted, and an operating system (OS) and application program are read from a hard disk drive (HDD) 314 and executed, using the RAM 313 as a working memory.

Execution of an application program can, for example, instruct the mechanism controller 200 to execute image forming, control the operation panel 202 to present information to a user of the image forming device 100 and to accept operation input from the user.

A graphics processing unit (GPU) 315 executes digital image processing with respect to image data stored in an image memory 316. The digital image processing includes, for example, rasterization that converts image data in a format other than a bitmap format into a bitmap format.

The image memory 316 stores image data such as image data generated by the image reader 210. The mechanism controller 200 can read image data stored in the image memory 316.

A universal asynchronous receiver/transmitter (UART) 317 performs serial communication with the mechanism controller 200 for the purposes of instructing execution of image forming processing, and acquiring information such as notification of paper jams and the opening and closing of covers.

The LAN interface 318 executes processing for communicating with another device when the primary controller 201 is connected to a communication network such as a LAN. According to the present embodiment, the LAN interface 318 is connected to a secure communication network that is inaccessible to an external network to which the diagnostic server 101 is connected, such as a company LAN, and to the communication network 110 that is connected to the external network. Thus, the image forming device 100 cannot directly transmit diagnostic data to the diagnostic server 101.

(1-4) Structure of Mechanism Controller 200

Structure of the mechanism controller 200 is described below.

As illustrated in FIG. 3, the mechanism controller 200 includes a CPU 301, a ROM 302, and a RAM 303. When the CPU 301 is reset, a boot program is read and booted from the ROM 302, and a control program is read from the ROM 302 and executed using the RAM 303 as a working memory. The CPU 301 acquires a current time by referring to a timer 304. Further, as described above, image data can be read from the image memory 316 of the primary controller 201. A UART 305 executes serial communication with the primary controller 201.

The mechanism controller 200 includes an SD interface 306. The SD interface 306 executes processing such as for reading and writing data from and to the SD card 120. Using the SD interface 306, the CPU 301 writes diagnostic data to the SD card 120. Diagnostic data includes both sensor data that is output values from various sensors, and data generated using the sensor data. If the SD card 120 is removed from the mechanism controller 200 and mounted to the tablet terminal 102, diagnostic data can be transferred to the diagnostic server 101 via the wireless LAN router 103 and the communication network 110.

(1-5) Structure of Tablet Terminal 102

Structure of the tablet terminal 102 is described below.

Figure 4:
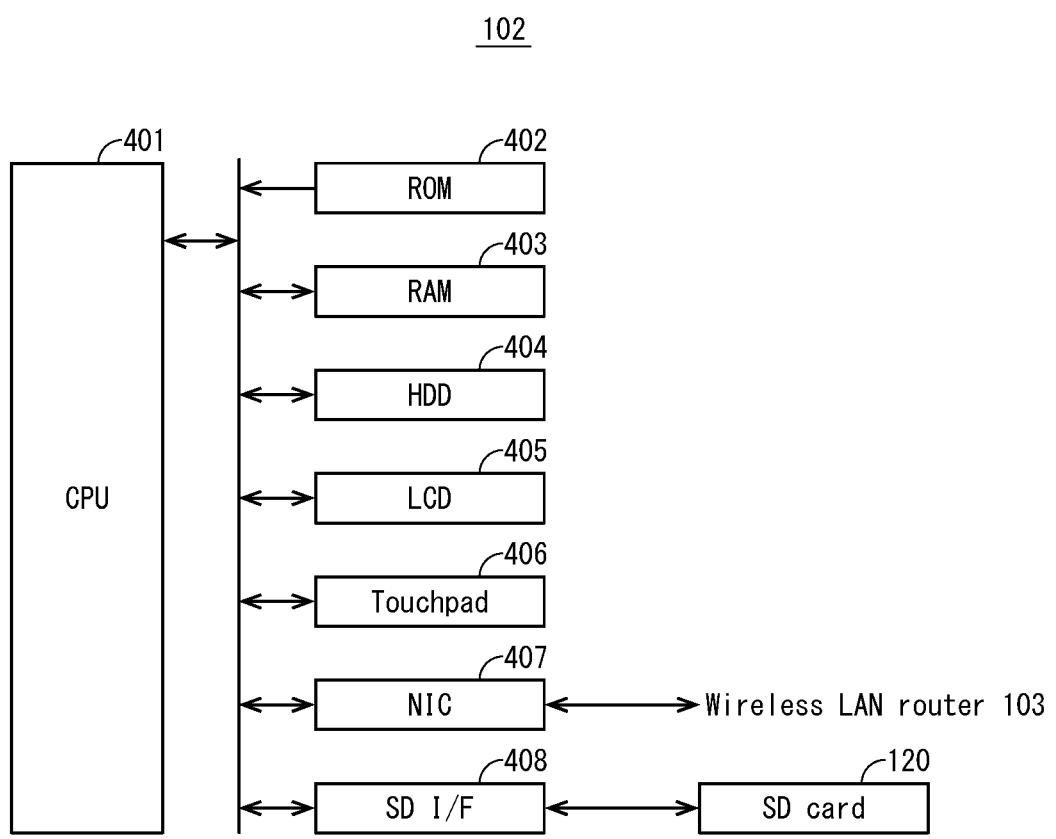
FIG. 4 is a block diagram illustrating structure of a tablet terminal 102.

As illustrated in FIG. 4, the tablet terminal 102 includes a CPU 401, a ROM 402, and a RAM 403. When the CPU 401 is reset, a boot program is read and booted from the ROM 402, and an operating system (OS) and application program is read from an HDD 404 and executed using the RAM 403 as a working memory.

The tablet terminal 102 includes a liquid crystal display (LCD) 405 and a touch pad 406, presents information to a user, and receives touch input. Further, a network interface card (NIC) 407 executes processing for the tablet terminal 102 to communicate with a device such as the diagnostic server 101 via the wireless LAN router 103 and the communication network 110.

The SD interface 408 executes processing for reading and writing data from and to the SD card 120 when mounted to the tablet terminal 102. The CPU 401, through execution of application programs, reads diagnostic data from the SD card 120 and transmits the diagnostic data to the diagnostic server 101 via the wireless LAN router 103 and the communication network 110.

The tablet terminal 102 may be used, for example, by a person servicing the image forming device 100 (also referred to as a "service person"). As illustrated in FIG. 1, a service person mounts the SD card 120 that has been removed from the image forming device 100 to the tablet terminal 102, and used an application program installed in the tablet terminal 102 to transmit diagnostic data stored in the SD card 120 to the diagnostic server 101.

The diagnostic server 101 uses the diagnostic data transferred from the SD card 120 to perform failure diagnostics and life prediction. The diagnostic server 101 may return diagnostic results and prediction results to the tablet terminal 102 and display them for a service person to understand. Diagnostic results are, for example, a failure location specified by the diagnostic server 101 using the diagnostic data, and prediction results are, for example, a failure occurrence time or a life expiration time predicted by the diagnostic server 101.

If a service person is notified of a specified failure location when the image forming device 100 has already failed, time required for the service person to identify the failure location can be shortened and therefore downtime can be shortened to improve availability of the image forming device 100 and convenience for a user.

The diagnostic server 101 may store and retain diagnostic data transferred thereto. Thus, for example, feedback analysis can be used for a failure diagnostic algorithm and a life prediction algorithm used by the diagnostic server 101. Accordingly, it is possible to improve algorithms to improve accuracy of failure diagnostics and life prediction, and to shorten required processing times.

(1-6) Sheet Arrival Time T Detection Processing

The following describes a process of calculating a sheet arrival time T as diagnostic data.

The sheet arrival time T is a time required for a sheet to reach a defined position from a defined start position on a sheet conveyance path during image formation. If slippage occurs between a sheet feed roller and the sheet due to deterioration of the sheet feed roller or adhesion of paper dust or the like to the sheet feed roller, the sheet arrival time T becomes longer. When the sheet arrival time T exceeds a defined threshold value, the sheet feed roller is to be replaced.

Figure 5:
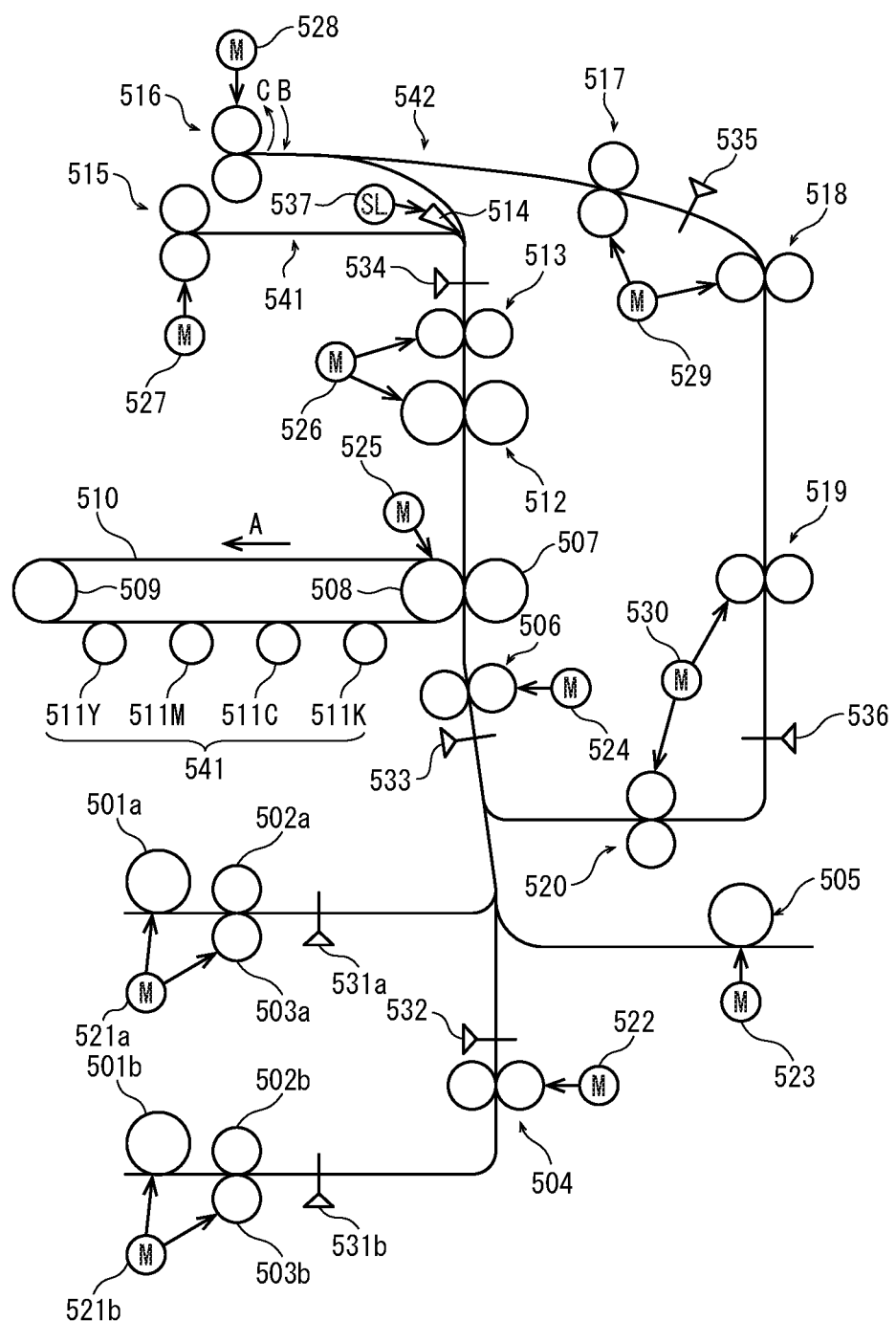
FIG. 5 is a diagram for describing sheet conveyance paths in the image forming device 100, in which structure related to 3rd and subsequent path feed trays is omitted.

For example, as illustrated in FIG. 5, when executing image forming processing with respect to a sheet stored in a first path sheet tray, a first path pick up roller 501a is used to feed a topmost sheet of a sheet stack stored in the first path sheet tray, and a first path sheet feed roller 502a is used to supply the topmost sheet to the conveyance path while a first path separation roller 503a is used to prevent double feeding of lower sheets.

When a first path sheet feed sensor 531a detects a leading edge of a sheet supplied by the first path sheet feed roller 502a, the first path sheet feed sensor 531a switches an output signal from off to on. As a result, the mechanism controller 200 detects a timing T1a at which the first path sheet feed sensor 531a detects the sheet.

Subsequently, the sheet is guided to a detection position of a timing sensor 533 by a conveyance guide (not illustrated). On detecting the leading edge of the sheet, the timing sensor 533 switches an output signal from off to on. Accordingly, when the timing sensor 533 outputs a timing T2b at which the sheet is detected, the mechanism controller 200 calculates the sheet arrival time T from the timing T1a to the timing T2b, and the calculated value is written as sensor data to the SD card 120.

Figure 6:
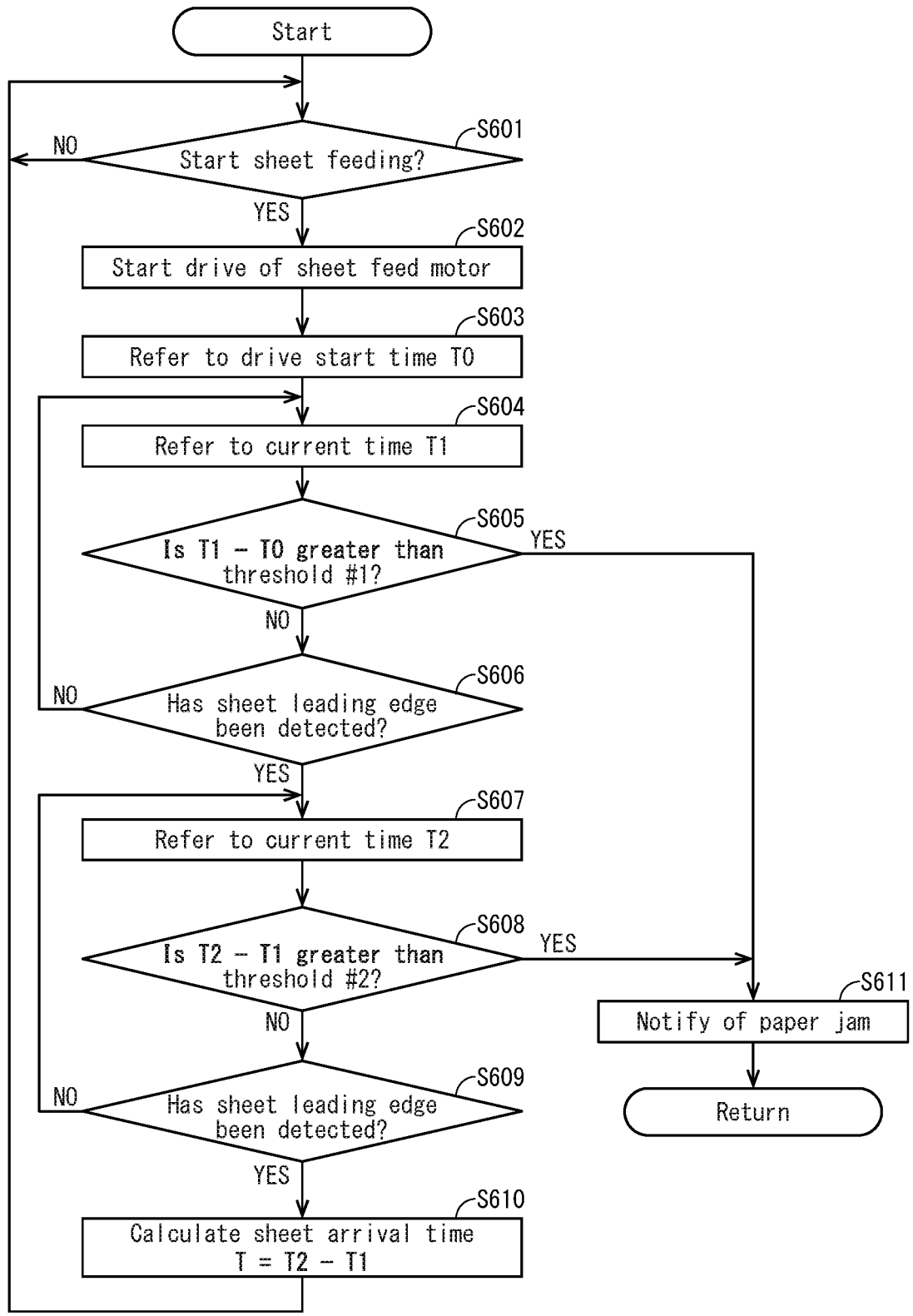
FIG. 6 is a flowchart for describing operations of the mechanism controller 200.

The following is a detailed description of this processing by the mechanism controller 200. As illustrated in FIG. 6, when feeding a sheet (S601: "YES"), the mechanism controller 200 starts driving a sheet feed motor 521a corresponding to a sheet feed tray in which a designated sheet type is stored (S602), and references the timer 304 to obtain a current time as a drive start time T0 (S603).

Subsequently, referring to the timer 304, a current time T1 is acquired (S604), and when an elapsed time from the drive start time (T1−T0) is larger than a defined threshold #1 (S605: "YES"), the leading edge of the sheet has not reached the sheet feed sensor 531a and it is assumed a paper jam has occurred, and therefore the primary controller 201 is notified of the paper jam (S611).

When notified of a paper jam, the primary controller 201 displays a notice on the operation panel 202 notifying a user of the image forming device 100 of the paper jam. The mechanism controller 200 may also write data indicating occurrence of the paper jam to the SD card 120.

When the elapsed time from the drive start time (T1−T0) has not become larger than the defined threshold #1 (S605: "NO") and the sheet feed sensor 531a detects the leading edge of the sheet (S606: "YES"), the current time T1 (time at which the leading edge of the sheet is detected by the sheet feed sensor 531a) is stored and processing proceeds to the next step.

A current time T2 is acquired by referencing the timer 304 (S607). When an elapsed time from detection of the leading edge of the sheet by the sheet feed sensor 531a is calculated (T2−T1), and the elapsed time (T2−T1) is larger than a defined threshold #2 (S608: "YES"), the leading edge of the sheet fed from the first path sheet feed tray has not arrived at the timing sensor 533, and it is assumed a paper jam has occurred, and therefore the primary controller 201 is notified of the paper jam (S611).

In this case, as in the case of S606: "YES", the primary controller 201 that has been notified of the paper jam causes display of a notice on the operation panel 202 to notify a user of the image forming device 100 of the paper jam. The mechanism controller 200 may also write data indicating occurrence of the paper jam to the SD card 120.

When the leading edge of the sheet is detected by the sheet feed sensor 531a before the elapsed time (T2−T1) (S608: "NO"), and the timing sensor 533 detects the leading edge of the sheet (S609: "YES"), the time T1 is subtracted from the current time T2 (the time when the leading edge of the sheet is detected by the timing sensor 533 or the second path vertical conveyance sensor 532) to calculate the sheet arrival time T and write it to the SD card 120 (S610).

Subsequently, processing proceeds to step S601, and the processing repeats.

If the pickup roller 501a, the sheet feed roller 502a, or the separation roller 503a deteriorates, or paper dust adheres to these rollers, slippage occurs between these rollers and a sheet and the sheet arrival time T is extended. When notifying the diagnostic server 101 of the sheet arrival time T, conventionally, in order to suppress a communication load between the mechanism controller 200 and the primary controller 201, an average value of the sheet arrival time T from every 50 times the sheet arrival time T is calculated, for example, is transmitted to the diagnostic server 101.

When a frequency of slippage between a roller and a sheet is low, even if the sheet arrival time T is extended due to slippage, an infrequently transmitted average value does not fluctuate significantly, and therefore the diagnostic server 101 cannot detect roller deterioration and the like.

Further, for example, when a maximum value of the sheet arrival time T is obtained from 50 calculations of the sheet arrival time T and transmitted to the diagnostic server 101, the communication load can be suppressed just as when transmitting the average value from 50 calculations, but there is a problem that if slippage occurs for the first calculation of the 50 calculations, detection of deterioration by the diagnostic server 101 is delayed.

Further, if the intent is to wait until frequency of slippage exceeds a certain frequency in order to optimize deteriorated roller replacement frequency, the frequency of slippage cannot be determined only from notification of maximum values, and therefore such notification is inappropriate.

In contrast, according to the present embodiment, the diagnostic server 101 is notified of the sheet arrival time T by using the SD card 120 from the mechanism controller 200 without passing through the primary controller 201, and therefore it is possible to notify the diagnostic server 101 of each calculation of the sheet arrival time T without increasing a communication load between the mechanism controller 200 and the primary controller 201.

Accordingly, slippage of a sheet can be reliably detected by the diagnostic server 101, and action taken, without a maximum value of the sheet arrival time T being buried by excessive averaging, or a timing and frequency of slippage being unclear due to notification of only a maximum value.

Figures 7A, 7B, 7C:
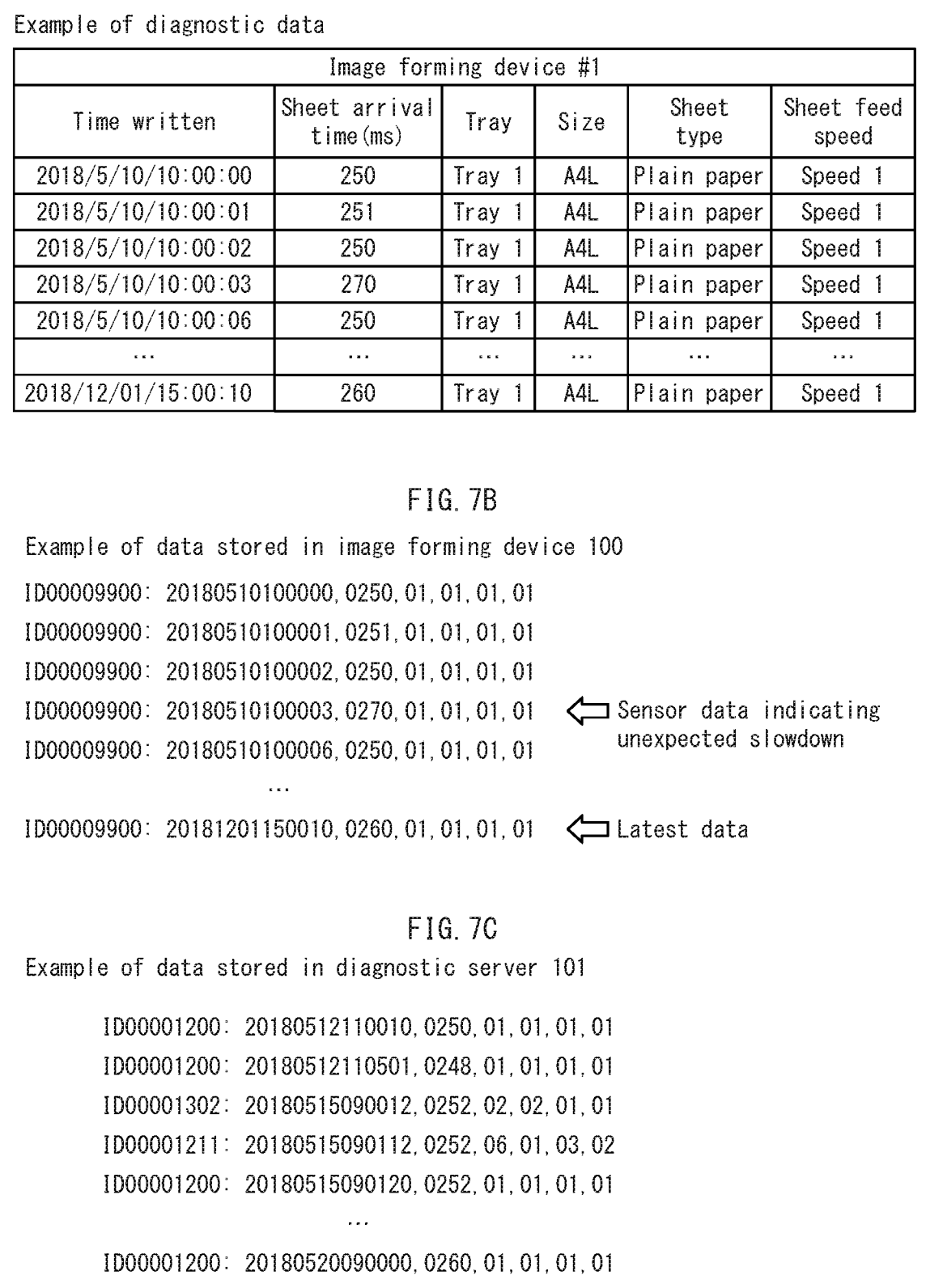

For example, in the table illustrated in FIG. 7A, the sheet arrival time T of an image forming device #1 is 270 milliseconds at 10:00:03 on May 10, 2018, but approximately 250 milliseconds at other timings. For example, if the sheet arrival time T is 270 milliseconds only once, and 49 other consecutive times it is 250 milliseconds, an average value for 50 times is (270+250×49)/50=250.4 milliseconds.

If a threshold value of the sheet arrival time T for detecting sheet slippage is 260 milliseconds, 250.4 milliseconds is smaller than the threshold value, and therefore the diagnostic server 101 would not detect the slippage of the sheet. In contrast, according to the present embodiment, the diagnostic server 101 is notified of all of the sheet arrival times T without calculation of an average value, and the sheet arrival time T at 10:00:03 on May 10, 2018 of 270 milliseconds is larger than the threshold value, and therefore the diagnostic server 101 can detect the slippage of the sheet.

Further, for example, if the sheet arrival time T at 10:00:03 on May 10, 2018 is 270 milliseconds and exceeds the threshold value, and if the diagnostic server 101 causes the image forming device 100 to stop image forming processing, it becomes possible to prevent a paper jam due to sheet slippage occurring in subsequent image forming processing. Paper jams caused by sheet slippage cannot be reliably prevented when determining and notifying the diagnostic server 101 of a maximum value of the sheet arrival time T from 50 repetitions, for example, as in conventional techniques.

Further, the diagnostic server 101 is notified of the sheet arrival time T by using the SD card 120 from the mechanism controller 200 without passing through the primary controller 201, and therefore image forming processing can be executed smoothly without increasing a communication load between the mechanism controller 200 and the primary controller 201.

The mechanism controller 200 and the primary controller 201 may use a shared memory instead of the UART for image forming processing communication.

Further, the mechanism controller 200 may write a plurality of the sheet arrival time T to the SD card 120 at once, where the plurality is within a numerical range that still allows for accuracy of failure diagnostics and life prediction by the diagnostic server 101. If the sheet arrival time T cannot be transferred from the SD card 120 due to failure or maintenance of the diagnostic server 101, the SD card 120 can be left mounted to the image forming device 100 until transfer is possible. When transfer becomes possible, the sheet arrival times T stored in the SD card 120 may be collectively transferred to the diagnostic server 101.

FIG. 7B illustrates an example data format used when the image forming device 100 stores the diagnostic data illustrated in FIG. 7A in the SD card 120. In this data format, the diagnostic data of FIG. 7A is converted to numerical values and an ID of the image forming device 100 is added. According to the present embodiment, a data format when accumulating diagnostic data in the diagnostic server 101 is the same as the data format when the image forming device 100 accumulates diagnostic data in the SD card 120, as illustrated in FIG. 7C.

If a data format is common to the image forming device 100 and the diagnostic server 101 in this way, conversion of data format is not required when transferring diagnostic data from the SD card 120 to the diagnostic server 101. FIG. 8 illustrates data on the diagnostic server 101 after adding the diagnostic data illustrated in FIG. 7B from the SD card 120 to the diagnostic data illustrated in FIG. 7C.

(1-6) Other Examples of Diagnostic Data

The following describes other examples of diagnostic data.

(1-6-1) Cumulative Rotations of Photosensitive Drum 511

The mechanism controller 200 may write cumulative rotations of the photosensitive drum 511 to the SD card 120 as diagnostic data.

The photosensitive drum 511 has a structure in which a photosensitive layer that forms an electrostatic latent image through charging and light exposure is covered with a protective layer. When the protective layer wears down, the photosensitive layer below the protective layer may be worn down, risking uneven charging, uneven light exposure, and uneven development that may cause deterioration of toner image quality.

A state of wear of the protective layer and the photosensitive layer correlates with the cumulative number of rotations of the photosensitive drum 511, and therefore if the mechanism controller 200 transmits the cumulative number of rotations of the photosensitive drum 511 to the diagnostic server 101 as diagnostic data, the diagnostic server 101 can estimate the state of wear of the photosensitive drum 511 from the cumulative number of rotations and predict the life of the photosensitive drum 511.

Figure 9:
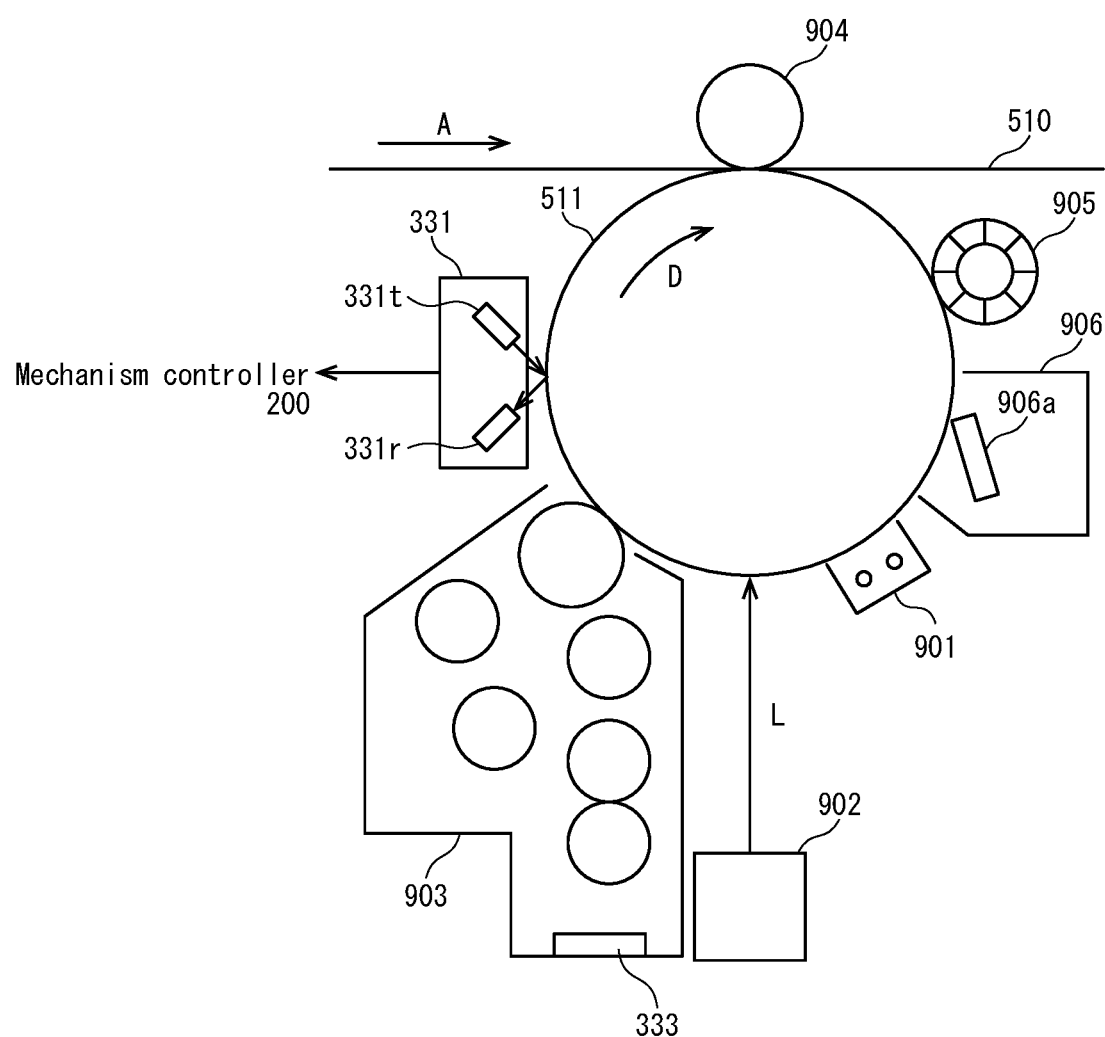
FIG. 9 illustrates structure of an imaging unit of the image forming device 100.

FIG. 9 is a diagram illustrating structure of the imaging units of the image forming device 100, and the photosensitive drums 511Y, 511M, 511C, 511K for each color YMCK, illustrated in FIG. 5, are also referred to as the photosensitive drum 511.

As illustrated in FIG. 9, in the image forming device 100 during image formation: a charger 901 uniformly electrically charges an outer circumferential surface of the photosensitive drum 511 while the photosensitive drum 511 is driven to rotate in a direction of arrow D; an exposer 902 irradiates the outer circumferential surface of the photosensitive drum 511 with laser light L modulated according to image data, in order to form an electrostatic latent image; a developer unit 903 supplies a corresponding color of toner to visualize the electrostatic latent image as a toner image; and a primary transfer roller 904 electrostatically transfers the toner image onto an outer circumferential surface of an intermediate transfer belt 510 (primary transfer).

The mechanism controller 200 counts the cumulative number of rotations for each color YMCK of the photosensitive drum 511, and each time the photosensitive drum 511 makes a defined number of rotations, the cumulative number of rotations of the photosensitive drum 511 is written to the SD card 120 as diagnostic data.

The mechanism controller 200 uses the SD card 120 to transfer the cumulative number of rotations to the diagnostic server 101 for each color YMCK of the photosensitive drum 511 without relaying through the primary controller 201, and therefore a communication load with the primary controller 201 is not increased, and transmission frequency of the cumulative number of rotations can be increased to improve accuracy of failure diagnosis and life prediction by the diagnostic server 101.

If a defined toner patch is formed on the outer circumferential surface of the photosensitive drum 511, and an amount of specular reflection in the toner patch is detected by using a surface state sensor 331, an amount of toner adhered to the outer circumferential surface of the photosensitive drum 511 can be detected. The amount of toner adhering to the outer circumferential surface of the photosensitive drum 511 may vary depending on a state of the outer circumferential surface of the photosensitive drum 511. Thus, if the mechanism controller 200 writes the amount of specular reflection in the toner patch to the SD card 120 as diagnostic data that is then transferred to the diagnostic server 101, the diagnostic server 101 can predict the life of the photosensitive drum 511.

(1-6-2) Fixing Heater Supply Voltage

The mechanism controller 200 may write a supply voltage value of a fixing heater to the SD card 120 as diagnostic data.

The image forming device 100 supplies high voltage electric power to the fixing heater (not illustrated) for raising a temperature of a fixing roller 512, and the voltage supplied changes according to deterioration of the fixing heater over time. Thus, if the mechanism controller 200 writes the supply voltage value of the fixing heater to the SD card 120 as diagnostic data that is then transferred to the diagnostic server 101, the diagnostic server 101 can perform failure diagnostics and life prediction for the fixing heater.

(1-6-3) Cartridge Motor Rotation

The mechanism controller 200 may write a number of rotations of a cartridge motor to the SD card 120 as diagnostic data.

Figure 10:
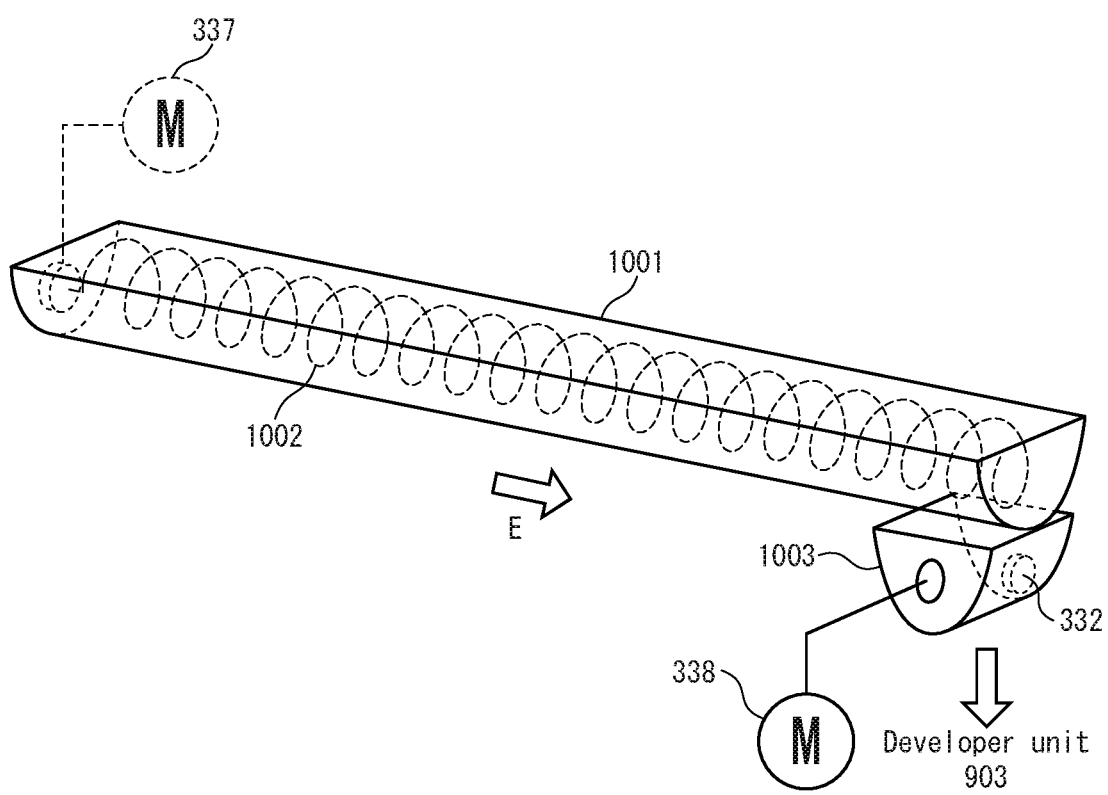
FIG. 10 illustrates a mechanism to convey developer from a toner cartridge 1001 to a developer unit 903 via a sub-hopper 1003.

As illustrated in FIG. 10, developer in the toner cartridge 1001 is conveyed in a direction indicated by an arrow E by rotation of a spiral conveyor 1002 driven by a cartridge motor 337, and falls into a sub-hopper 1003. The cartridge motor 337 is a stepping motor, for example, and an amount of developer dropped into the sub-hopper 1003 is adjusted by controlling an amount of rotation of the spiral conveyor 1002. Developer dropped into the sub-hopper 1003 is conveyed to the developer unit 903 by a paddle (not illustrated) rotated by a sub-hopper motor 338. A piezo sensor 332 is provided in the sub-hopper 1003 to detect an amount of developer in the sub-hopper 1003.

The mechanism controller 200 references an output signal of a toner cartridge door cover sensor 335 to detect that the toner cartridge door cover 222 is opened/closed, and references an output signal of a toner cartridge set sensor 334. When the mechanism controller 200 detects that the toner cartridge 1001 is attached, based on the output signal from the toner cartridge set sensor 334, the mechanism controller 200 drives the cartridge motor 337 to start supply of developer.

When a cover to be opened/closed to access the toner cartridge 1001 is the front cover 223, the mechanism controller 200 can perform similar processing by referencing an output signal of a front cover sensor 336 that detects an open/closed state of the front cover 223.

Further, the developer unit 903 stores developer therein, and includes a toner carrier ratio (TCR) sensor 333 for detecting toner concentration of the stored developer. As the TCR sensor 333, a magnetic permeability sensor may be used, for example. That is, if attention is paid to the fact that magnetic permeability of toner in developer is different from that of a carrier, toner concentration can be specified by detecting magnetic permeability of the developer.

The mechanism controller 200 references an output signal of the TCR sensor 333, and also drives the cartridge motor 337 to supply developer to the developer unit 903 from the toner cartridge 1001 when it is determined that toner concentration in the developer unit 903 is low.

Thus, if the mechanism controller 200 writes a rotation amount of the cartridge motor 337 to the SD card 120 as diagnostic data that is then transferred to the diagnostic server 101, the diagnostic server 101 can be informed of a remaining toner amount in the toner cartridge 1001 by using the diagnostic data, and therefore life of the toner cartridge 1001 can be predicted.

(1-6-4) Surface State of Photosensitive Drum 511

If the mechanism controller 200 writes a surface state of the photosensitive drum 511 to the SD card 120 as diagnostic data that is then transferred to the diagnostic server 101, the diagnostic server 101 can predict life of a lubricant supplier 905 that supplies lubricant to the surface of the photosensitive drum 511.

A cleaning device 906 illustrated in FIG. 9 uses a cleaning blade 906a to scrape off and discard toner remaining on the outer circumferential surface of the photosensitive drum 511 after the primary transfer. During this cleaning, if friction between the photosensitive drum 511 and the cleaning blade 906a is too great, the cleaning blade 906a is bent by the frictional force, making it difficult to scrape off residual toner.

Thus, in order to reduce the frictional force, a lubricant is applied to the photosensitive drum 511 using the lubricant supplier 905. However, when the lubricant supplier 905 is consumed due to deterioration over time, an amount of lubricant applied may decrease, and the frictional force between the photosensitive drum 511 and the cleaning blade 906a may not be sufficiently reduced.

The surface state sensor 331 is a specular reflection type of surface state sensor disposed facing the outer circumferential surface of the photosensitive drum 511 between the developer unit 903 and the primary transfer roller 904 in the rotation direction of the photosensitive drum 511. The surface state sensor 331 includes a light emitting element 331a comprising a light emitting diode (LED) and a light receiving element 331b comprising a phototransistor. The light emitting element 331a irradiates the outer circumferential surface of the photosensitive drum 511 with laser light at an incident angle of 45°, and the light receiving element 331b receives specularly reflected light from the photosensitive drum 311, or in other words light reflected at a reflection angle of 45°.

When an appropriate amount of lubricant is present on the surface of the photosensitive drum 511, the surface of the photosensitive drum 511 is a matte white and reflects diffusely, but as the amount of lubricant on the photosensitive surface decreases, the surface of the photosensitive drum 511 becomes closer to a mirror-like surface, and light reflected from the photosensitive drum 511 includes more of a specular reflection component.

Accordingly, the amount of specular reflection light received by the light receiving element 331b changes in proportion to an amount of lubricant on the outer circumferential surface of the photosensitive drum 511. An output signal of the surface state sensor 331, or in other words an output signal of the light receiving element 331b is inputted to the mechanism controller 200. When the mechanism controller 200 references the output signal of the surface state sensor 331 to generate diagnostic data and writes to the SD card 120 the diagnostic data that is then transferred to the diagnostic server 101, the diagnostic server 101 can reference the diagnostic data to predict life of the lubricant supplier 905.

(1-6-5) Sheet Arrival Time T

As the sheet arrival time T, the following definitions can be used in addition to that described above.

For example, when executing image forming processing with respect to a sheet stored in the second path sheet feed tray, the second path pickup roller 501b is used to pick up a topmost sheet of a sheet stack stored in the second path sheet feed tray, and the second path sheet feed roller 502b is used to feed the sheet to the conveyance path while the second path separation roller 503b is used to prevent double-feeding of lower sheets in the sheet stack.

When the second path sheet feed sensor 531b detects a leading edge of a sheet supplied by the second path sheet feed roller 502b, the second path sheet feed sensor 531b switches an output signal from off to on. As a result, the mechanism controller 200 detects a timing T1b at which the second path sheet feed sensor 531b detects the sheet.

Subsequently, the sheet is guided to a detection position of the second path vertical conveyance sensor 532 by a conveyance guide (not illustrated). On detecting the leading edge of the sheet, the second path vertical conveyance sensor 532 switches an output signal from off to on. Accordingly, when the second path vertical conveyance sensor 532 outputs a timing T2b at which the sheet is detected, the mechanism controller 200 calculates a second path sheet arrival time T from the timing T1b to the timing T2b, and the second sheet arrival time T is transmitted to the diagnostic server 101 as sensor data.

The first path pickup roller 501a, the first path sheet feed roller 502a, and the first path separation roller 503a are rotatably driven by the first path sheet feed motor 521a, while the second path pickup roller 501b, the second path sheet feed roller 502b, and the second path separation roller 503b are rotatably driven by the second path sheet feed roller 521b. The mechanism controller 200 controls drive of the first path sheet feed motor 521a and the second path sheet feed motor 521b.

Sheet feeding from a third path and subsequent sheet feed trays is similar to that of sheet feeding from the first path and second path sheet feed trays.

The image forming device 100 can supply sheets from a manual multi-sheet feed tray in addition to the first path sheet feed tray and the second path sheet feed tray. Sheets set in the manual multi-sheet feed tray are fed one-by-one starting with a topmost sheet by using a manual multi-sheet feed roller 505 that is rotationally driven by a manual multi-sheet feed motor 523.

A sheet supplied as described above is further conveyed as described below, to have an image formed thereon.

The timing motor 524 stops rotation of the timing roller 506 prior to the arrival of the sheet, and starts rotation of the timing roller 506 after a defined time elapses from detection of a leading edge of the sheet by the timing sensor 532. In this way, the sheet is conveyed to abut against a conveyance nip of the timing roller 506 whose rotation is stopped, then while the leading end of the sheet is prevented from passing through the conveyance nip, the sheet arches, thereby correcting skew. Further, by controlling a timing of starting rotation of the timing roller 506, a toner image can be transferred to an appropriate position on the sheet.

An imaging unit 541 includes the photosensitive drums 511Y, 511M, 511C, 511K for forming toner images of yellow (Y), magenta (M), cyan (C), and black (K), and sequentially forms YMCK toner images on outer circumferential surfaces of the photosensitive drums 511Y, 511M, 511C, 511K, by using the charger 901, the exposer 902, and the developer 903.

The toner images of each color are electrostatically transferred by the primary transfer roller 904 from the outer circumferential surfaces of the photosensitive drums 511Y, 511M, 511C, 511K to the outer circumferential surface of the intermediate transfer belt 510 so as to overlap with each other to form a color toner image. The intermediate transfer belt 510 is wound around a driving roller 508 and a driven roller 509, and a main motor 525 rotationally drives the driving roller 508 to cause the intermediate transfer belt 510 to move in a direction indicated by an arrow A.

A secondary transfer roller 507 is pressed against the drive roller 508 with the intermediate transfer belt 510 disposed therebetween, forming a secondary transfer nip. The timing roller 506 conveys the sheet to the secondary transfer nip while the intermediate transfer belt 510 conveys the color toner image to the secondary transfer nip, and the color toner image is electrostatically transferred to the sheet at the secondary transfer nip.

The sheet onto which the color toner image has been electrostatically transferred has the color toner image heat-fixed by a fixing roller 512, and is then further conveyed by a sheet pre-discharge roller 513. A sheet discharge sensor 534 is disposed downstream of the sheet pre-discharge roller 513 in the sheet conveyance direction, and detects the leading edge of the sheet. A reverse path switching solenoid 537 switches a direction of a switcher 514 according to timing of detection of the leading edge of the sheet by the sheet discharge sensor 534.

As a result, conveyance of the sheet is switched to either a sheet discharge path 541 or a sheet reverse path 542. In particular, when performing double-sided printing over a plurality of pages, the direction of the switcher 514 is switched due to detection of the leading edge of the sheet by the sheet discharge sensor 534, in order to alternately guide a sheet printed on only one side to the sheet reverse path 542 and a sheet printed on both sides to the sheet discharge path 541.

The sheet guided to the sheet discharge path 541 is discharged to outside by a sheet discharge roller 515 rotated by a sheet discharge motor 527. On the other hand, the sheet guided to the sheet reverse path 542 is further drawn into the sheet reverse path 542 by a reversing motor 528 rotationally driving a reversing roller 516 in a direction of an arrow B, after which the reversing motor 528 rotates in reverse to rotationally drive the reversing roller 516 in a direction of an arrow C, sending the sheet towards an automatic duplex unit (ADU) conveyance roller 517.

The sheet is conveyed by ADU conveyance rollers 517, 518, 519, 520 along the sheet reverse path 542 until a leading edge of the sheet hits the timing roller 506.

The ADU conveyance rollers 517, 518 are rotationally driven by an ADU conveyance motor 529, and the ADU conveyance rollers 519, 520 are rotationally driven by an ADU conveyance motor 530. Further, by monitoring a timing at which ADU conveyance sensors 535, 536 detect the leading edge of the sheet, it is possible to detect a paper jam on the sheet reverse path 542.

A color toner image is then electrostatically transferred to a back surface of the sheet that has entered the secondary transfer nip via the sheet reverse path 542, the color toner image is thermally fixed by the fixing roller 512, and the sheet guided to the sheet discharge path 541 by the switcher 514 and discharged outside.

According to the image forming device 100 with such a structure, the mechanism controller 200 references output signals from at least the first path sheet feed sensor 531a, the second path sheet feed sensor 531b, the second path vertical conveyance sensor 532, the timing sensor 533, the discharge sensor 534, and the ADU conveyance sensors 535, 536, in order to detect the timing of arrival of the leading edge and/or trailing edge of the sheet at the detection position of a corresponding sheet sensor.

As a result, the first path sheet feed motor 521a, the second path sheet feed motor 521b, the second path vertical conveyance motor 522, the manual multi-sheet feed motor 523, the timing motor 524, the main motor 525, the fixing motor 526, the sheet discharge motor 527, the reverse motor 528, the ADU conveyance motors, 529, 530, and the reverse path switching solenoid 537 are drive-controlled.

Further, the mechanism controller 200 detects occurrence of a paper jam from a delay in arrival timing.

Further, if the mechanism controller 200 calculates the sheet arrival time T that indicates the arrival timing and writes the sheet arrival time T to the SD card 120, which is then transferred to the diagnostic server 101, the diagnostic server 101 can perform failure diagnostics and life prediction by referencing the sheet arrival time T, determining deterioration due to wear and degradation due to adhesion of paper dust is occurring in the timing roller 506, the secondary transfer roller 507, the fixing roller 512, the sheet pre-discharge roller 513, the sheet discharge roller 515, the reverse roller 516, or the ADU conveyance rollers 517, 518, 519, 520.

(1-6-6) Torque Values of Drive Motors 521

The mechanism controller 200 may calculate torque values of each motor by referencing drive currents of the drive motors 521, and may write the torque values to the SD card 120 as diagnostic data.

Torque values of the drive motors 521 change according to states of wear of the first path pickup roller 501a, the first path sheet feed roller 502a, the first path separation roller 503a, the second path pickup roller 501b, the second path sheet feed roller 502b, the second path separation roller 503b, the second path vertical conveyance roller 504, the manual multi-sheet feed roller 505, the timing roller 506, the secondary transfer roller 507, the fixing roller 512, the sheet pre-discharge roller 513, the discharge roller 515, the reverse roller 516, and the ADU conveyance rollers 517, 518, 519, 520, also collectively known as rollers 501.

Thus, if the mechanism controller 200 writes torque values of the drive motors 521 to the SD card 120 as diagnostic data that is then transferred to the diagnostic server 101, the diagnostic server 101 can predict the life of the rollers 501.

[2] Embodiment 2

According to the image forming device diagnostic system 1 pertaining to Embodiment 2, the mechanism controller 200 stores diagnostic data in an HDD, a service person transfers the diagnostic data to a notebook PC by serial communication, and the diagnostic data is then transferred to the diagnostic server 101 via the notebook PC.

Figure 11:
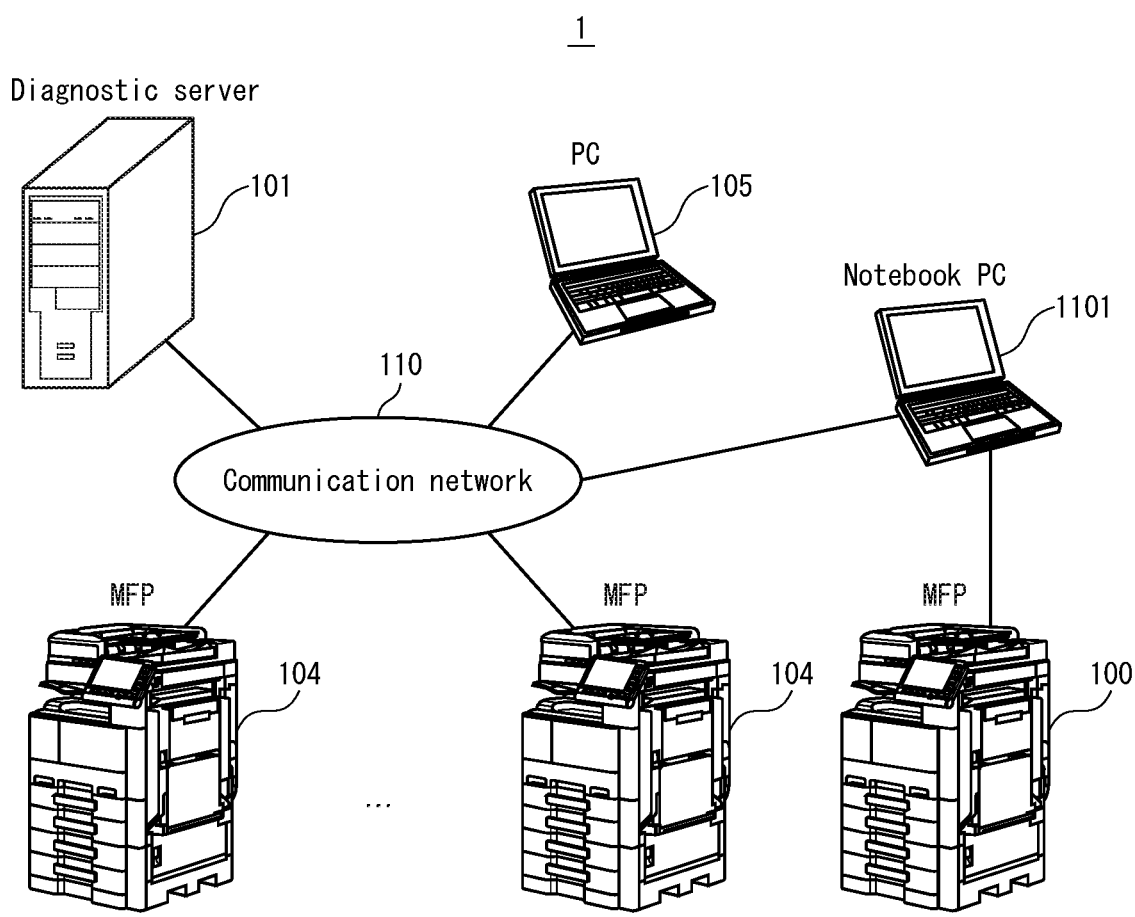
FIG. 11 is a diagram illustrating the image forming device diagnostic system 1 according to Embodiment 2.

As illustrated in FIG. 11, the image forming device diagnostic system 1 includes a notebook PC 1101 (any portable information processing terminal may be used, not necessarily a notebook PC) that can be serially connected to the image forming device 100. A person servicing the image forming device 100 carries the notebook PC 1101 and serially connects it to the image forming device 100 when the image forming device 100 malfunctions or when carrying out a scheduled inspection.

The service person operates an application program installed on the notebook PC 1101 to transfer the diagnostic data from the image forming device 100 to the notebook PC 1101 by serial communication. Further, the notebook PC 1101 is wirelessly connected or wired to the communication network 110 such as the Internet, and the diagnostic data is transferred from the notebook PC 1101 to the diagnostic server 101 via the communication network 110.

The diagnostic server 101 uses the diagnostic data transferred to perform failure diagnostics and life prediction for the image forming device 100. If the service person operates the application program installed on the notebook PC 1101 to obtain diagnostics results and prediction results from the diagnostic server 101, then work to be performed on the image forming device 100 can be determined by referring to these results.

Figure 12:
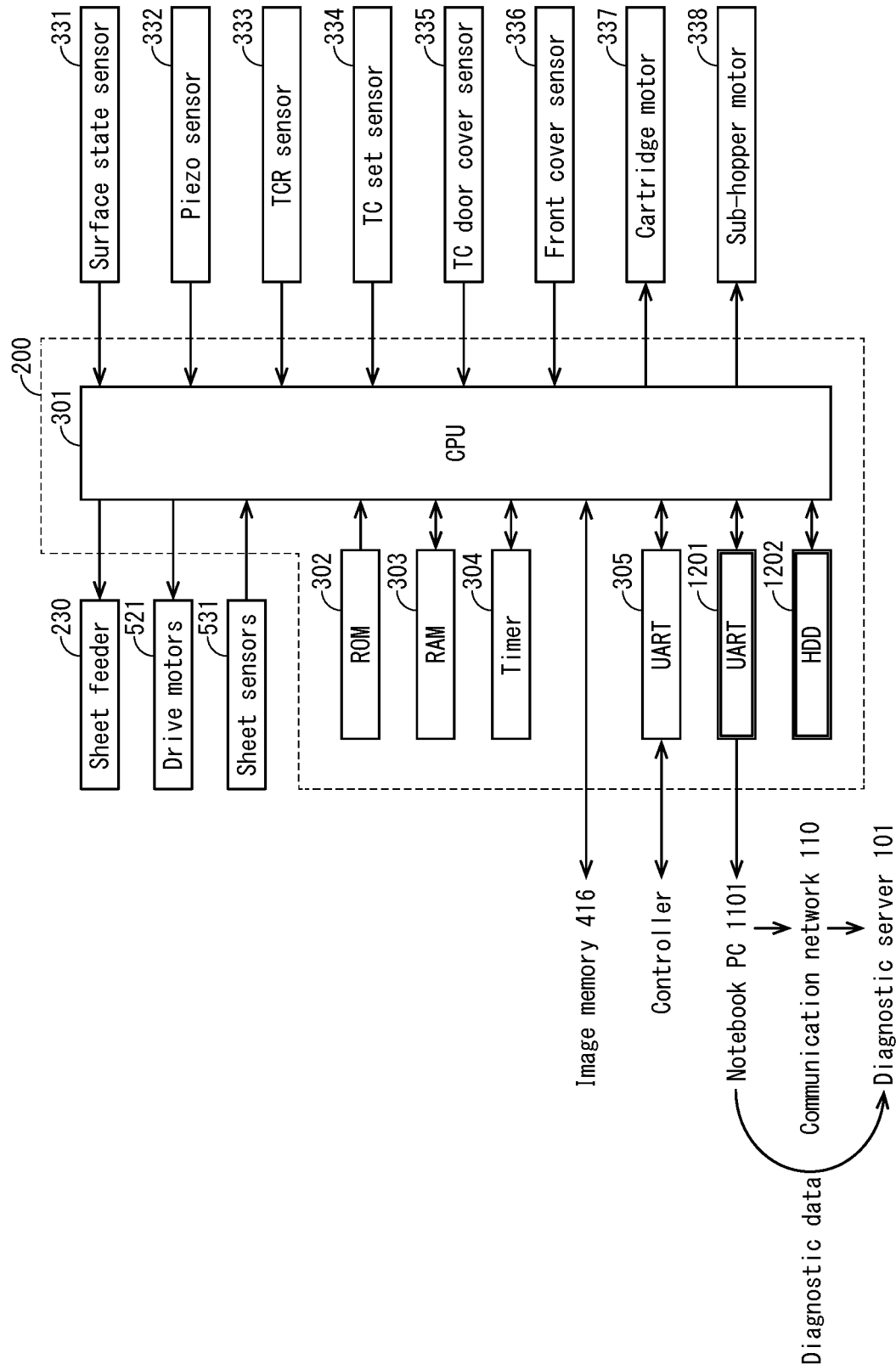
FIG. 12 is a block diagram illustrating structure of the mechanism controller 200 pertaining to Embodiment 2.

As illustrated in FIG. 12, the mechanism controller 200 of the image forming device 100 pertaining to the present embodiment includes a UART 1201 for serial communication with the notebook PC 1101 in addition to the UART 305 for serial communication with the primary controller 201. Further, the mechanism controller 200 includes an HDD 1202, but this may be a storage other than an HDD as long as it is a high-capacity non-volatile storage.

Unlike the mechanism controller 200 pertaining to Embodiment 1, the mechanism controller 200 pertaining to the present embodiment need not include the SD interface 306.

The mechanism controller 200 writes and stores diagnostic data in the HDD 1202 each time diagnostic data is generated. When the mechanism controller 200 serially connected to the notebook PC 1101 receives a request for diagnostic data, the mechanism controller 200 reads the diagnostic data from the HDD 1202 and serially transmits the diagnostic data to the notebook PC 1101.

In this way, when diagnostic data cannot be directly transmitted from the image forming device 100 to the diagnostic server 101, transferring the diagnostic data via the notebook PC 1101 means that the diagnostic server 101 can perform failure diagnostics and life prediction. Further, the mechanism controller 200 directly transmits diagnostic data to the notebook PC 1101, and therefore a large amount of diagnostic data can be transmitted to the notebook PC 1101 and the diagnostic server 101 without hindering serial communication with the primary controller 201.

[3] Embodiment 3

According to the image forming device diagnostic system 1 pertaining to Embodiment 3, the primary controller 201 stores diagnostic data in an HDD, a service person transfers the diagnostic data to a notebook PC by serial communication, and the diagnostic data is then transferred to the diagnostic server 101 via the notebook PC.

The image forming device diagnostic system 1 pertaining to the present embodiment has largely the same structure as the image forming device diagnostic system 1 pertaining to Embodiment 2, but there are differences in the structures of the mechanism controller 200 and the primary controller 201 of the image forming device 100.

Figure 13:
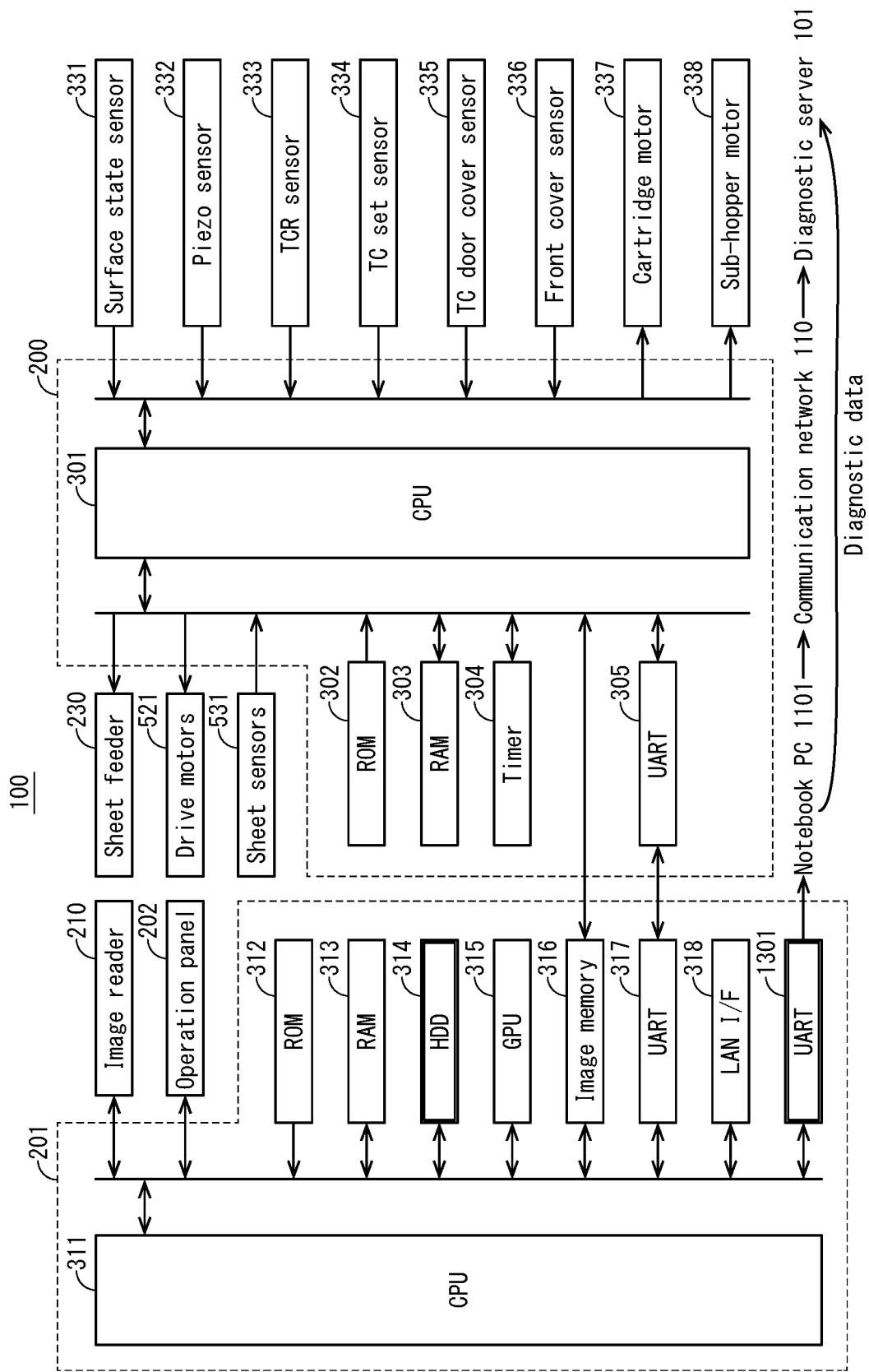
FIG. 13 is a block diagram illustrating structure of the mechanism controller 200 and the primary controller 201 pertaining to Embodiment 3.

As illustrated in FIG. 13, the primary controller 201 according to the present embodiment includes a UART 1301 for serial communication with the notebook PC 1101 in addition to the UART 317 for serial communication with the mechanism controller 200. Further, the HDD 314 included in the primary controller 201 is used for storing image data for copying and printing. According to the present embodiment, the HDD 314 is also used for storing diagnostic data.

Further, according to the present embodiment, the mechanism controller 200 need not include the SD interface 306.

The mechanism controller 200 transmits diagnostic data to the primary controller 201 by serial communication using the UART 305 each time the diagnostic data is generated. The primary controller 201 writes and stores the diagnostic data received by serial communication with the UART 317 in a defined storage area of the HDD 314. When the primary controller 201 receives a request for diagnostic data from the notebook PC 1101 by serial communication using the UART 1301, the primary controller 201 reads diagnostic data from the HDD 314 and transmits the diagnostic data to the notebook PC 1101 by serial communication.

In this way, when diagnostic data cannot be directly transmitted from the image forming device 100 to the diagnostic server 101, transferring the diagnostic data via the notebook PC 1101 means that the diagnostic server 101 can perform failure diagnostics and life prediction. According to the present embodiment, transmission of diagnostic data by serial communication from the mechanism controller 200 to the primary controller 201 is required, and therefore in consideration of an increase in communication load on the communication path, a reduction in number of transmissions of diagnostic data is preferable.

Further, diagnostic data may be stored in the image memory 316 instead of the HDD 314. The image memory 316 can be accessed not only by the primary controller 201 but also directly by the mechanism controller 200, for example as a dual port memory, without relaying through the primary controller 201.

Each time diagnostic data is generated, the mechanism controller 200 writes and stores the diagnostic data in a defined storage area of the image memory 316. When the primary controller 201 receives a request for diagnostic data from the notebook PC 1101 by serial communication, the primary controller 201 reads diagnostic data from the image memory 316 and transmits the diagnostic data to the notebook PC 1101 by serial communication.

In this way, diagnostic data is directly written from the mechanism controller 200 to the image memory 316, and therefore serial communication with the primary controller 201 is not hindered, and a large amount of diagnostic data can be transmitted to the notebook PC 1101 and the diagnostic server 101.

[4] Embodiment 4

The image forming device diagnostic system 1 pertaining to Embodiment 4 has largely the same structure as the image forming device diagnostic system 1 pertaining to Embodiment 1, but data formats of diagnostic data stored in the SD card 120 are different.

FIG. 14A illustrates diagnostic data in a data format pertaining to the present embodiment. The diagnostic data illustrated in FIG. 14A has the same number of entries (device ID, tray, time of data acquisition, sheet arrival time, etc.) as the diagnostic data illustrated in FIG. 7B, but the data format is more human-readable than the data format illustrated in FIG. 7B. Further, information that is not used by the diagnostic server 101 is also included to improve readability. When a service person or the like analyzes diagnostic data of the data format illustrated in FIG. 14A, there is a possibility that an analysis result can be obtained that cannot be obtained by the diagnostic server 101.

When readability of diagnostic data is increased, the risk of information leak via the diagnostic data is increased, and therefore it is preferable to take security measures. For example, input of a password may be required before reading the diagnostic data from the SD card 120, and reading of the diagnostic data may be prohibited if authentication of the password fails.

When transferring diagnostic data to the diagnostic server 101, a service person first removes the SD card 120 from the image forming device 100 then mounts a replacement SD card 120 to the image forming device 100. Next, after mounting on the tablet terminal 102 the SD card 120 removed from the image forming device 100, the service person uses an application program installed on the tablet terminal 102 to read the diagnostic data from the SD card 120.

The diagnostic data read from the SD card 120 is human-readable, as illustrated in FIG. 14A, but cannot be used as is by the diagnostic server 101, and therefore the service person uses the application program to convert the data format of the diagnostic data into a data format that can be used by the diagnostic server 101. FIG. 14B is a diagram illustrating diagnostic data obtained by converting the diagnostic data illustrated in FIG. 14A into a data format that can be used by the diagnostic server 101.

The service person further uses the application program to transmit the diagnostic data in the post-conversion data format to the diagnostic server 101. In this way, the same effects as those of Embodiment 1 can be obtained.

[5] Embodiment 5

Figure 15:
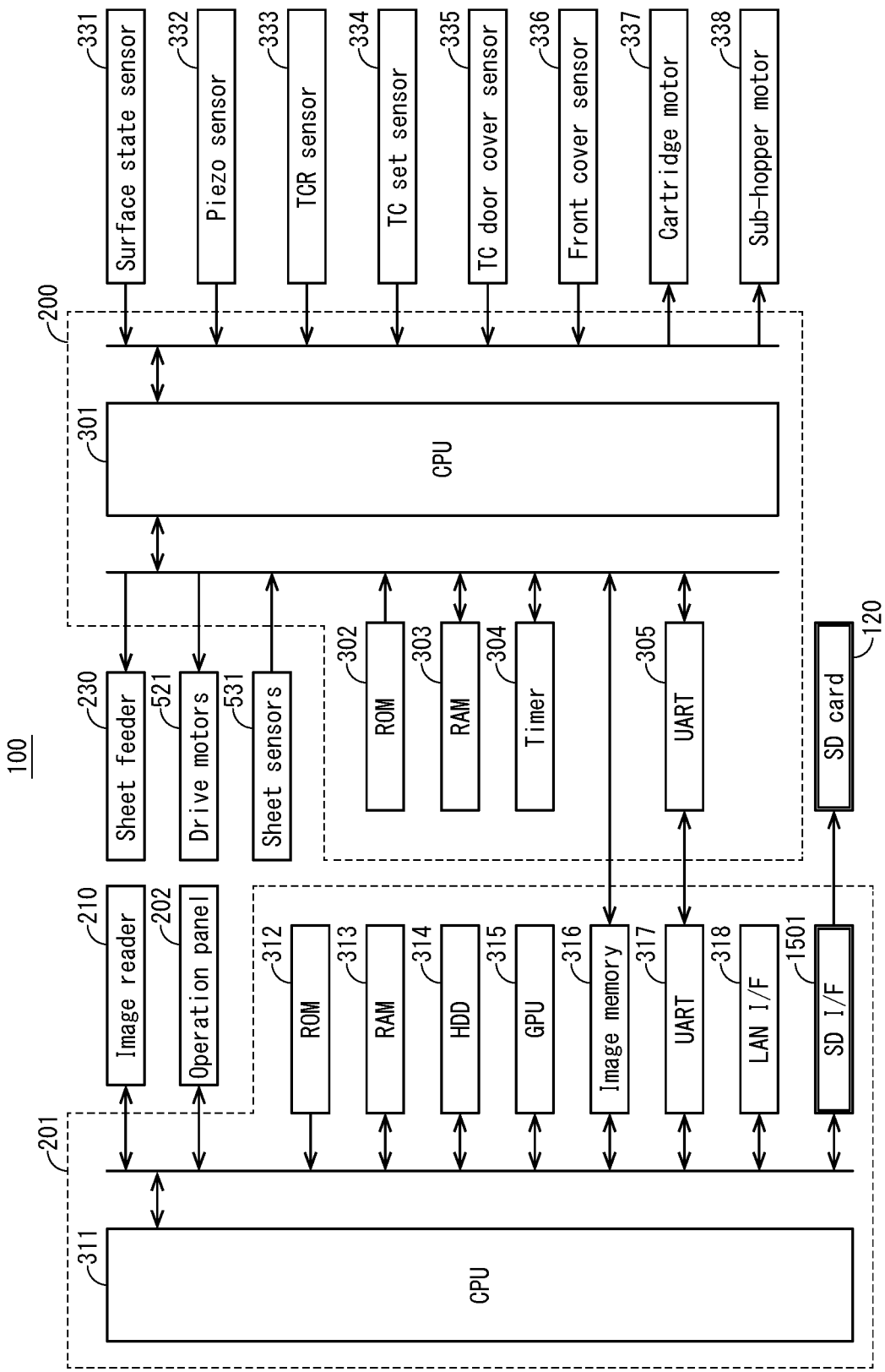
FIG. 15 is a block diagram illustrating structure of the mechanism controller 200 and the primary controller 201 pertaining to Embodiment 5.

The image forming device diagnostic system 1 pertaining to Embodiment 5 has a structure that is largely the same as that of the image forming device diagnostic system pertaining to Embodiment 1, but, as illustrated in FIG. 15, instead of the mechanism controller 200, the primary controller 201 is provided with an SD interface 1501 to which the SD card 120 is mounted, and the SD card 120 stores diagnostic data.

When the primary controller 201 receives diagnostic data from the mechanism controller 200 by serial communication, the primary controller 201 stores the diagnostic data in the SD card 120 in a ring buffer. That is, the diagnostic data is written sequentially to a defined storage area in the SD card 120 from a start address of the storage area, and when an end address of the storage area is reached, the diagnostic data is then overwritten in order from the start address.

In this way, as illustrated in FIG. 16, an address in a middle of the storage area may store a final entry of data (last written diagnostic data, or latest diagnostic data). The SD card 120 stores the start address and the end address of the storage area, and an address of the latest data, which are referred to when the primary controller 201 writes diagnostic data and when the diagnostic server 101 reads the diagnostic data.

In the example of FIG. 16, the start address is address 0, the end address is the last address of the SD card 120, and by writing a code "END" to an address after the latest data, the address immediately before "END" is indicated to be the address of the latest data.

Figure 17:
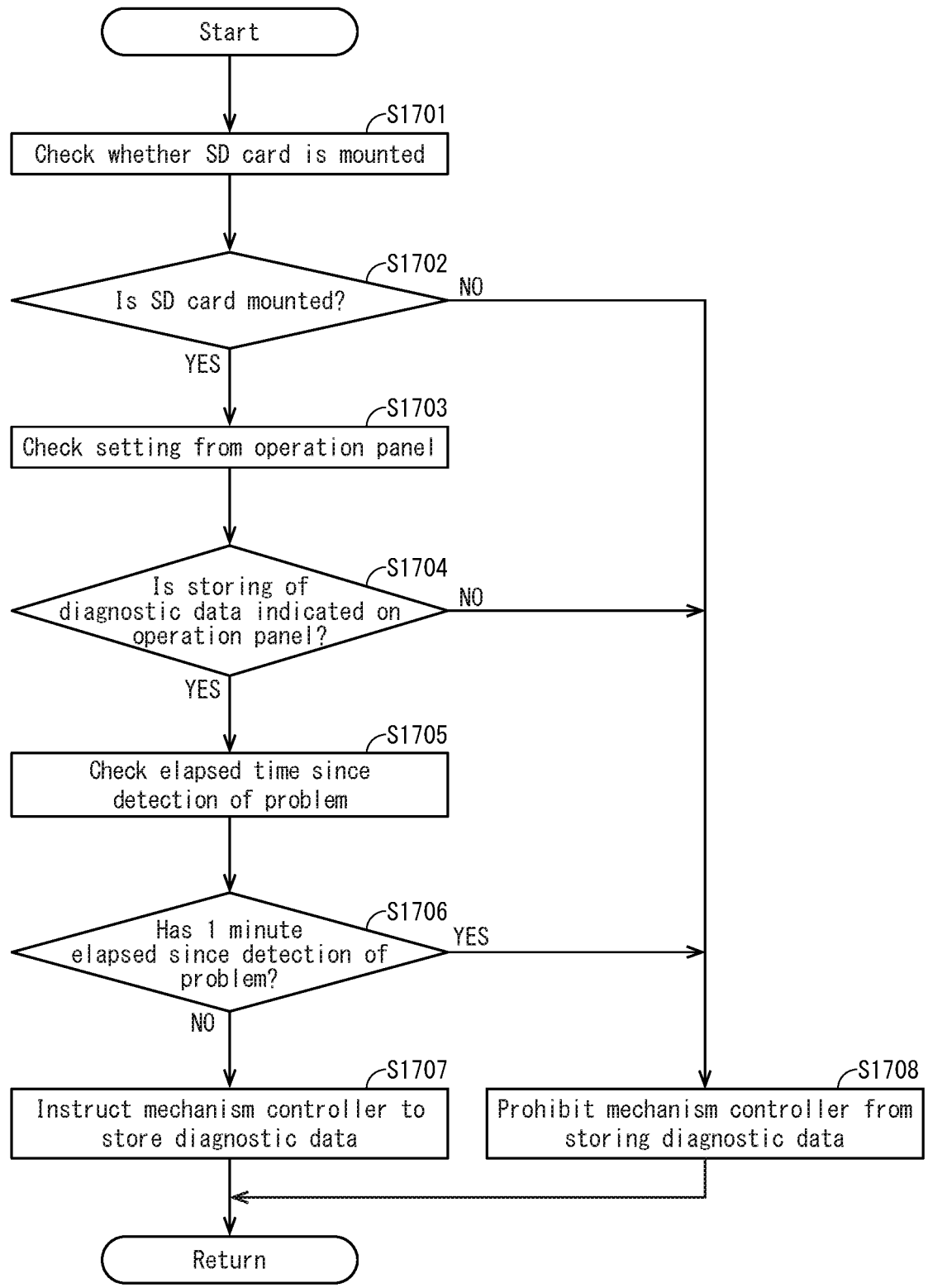
FIG. 17 is a flowchart for describing operations of the mechanism controller 200 pertaining to Embodiment 5.

Further, as illustrated in FIG. 17, the primary controller 201 pertaining to the present embodiment uses the SD interface to detect whether or not the SD card 120 is mounted (S1701). If the SD card 120 is not mounted to the SD interface 1501 (S1702: "NO"), the mechanism controller 200 is prohibited from generating and storing diagnostic data in the SD card 120 (S1708).

When the SD card 120 is mounted to the SD interface 1501 (S1702: "YES"), settings made by a user using the operation panel 202 of the image forming device 100 are checked (S1703). As a result, if it is confirmed that a user has instructed that diagnostic data is not to be stored in the SD card 120 (S1704: "NO"), the mechanism controller 200 is prohibited from generating and storing diagnostic data in the SD card 120 (S1708).

Figure 18:
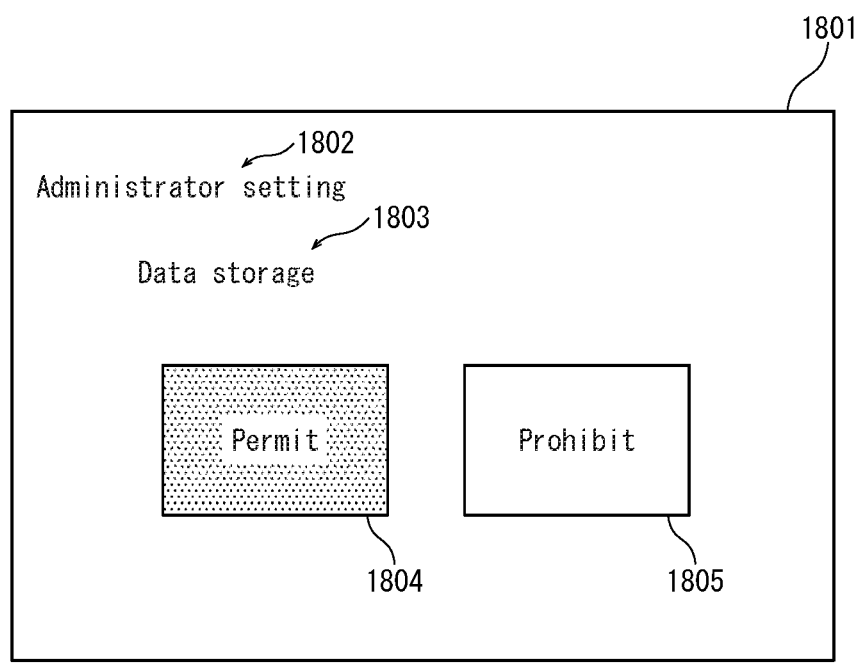
FIG. 18 illustrates a setting screen displayed on the operation panel 202 for setting whether or not data can be accumulated.

As illustrated in FIG. 18, a setting screen 1801 displayed on the touch panel of the operation panel 202 includes a display 1802 indicating that a setting requires an administrator, a display 1803 indicating that the screen is for setting whether or not to accumulate diagnostic data, a touch button 1804 for permitting accumulation of diagnostic data, and a touch button 1805 prohibiting accumulation of diagnostic data. When a user touches the touch button 1804, it is set that diagnostic data is stored in the SD card 120, and when a user touches the touch button 1805, is set that diagnostic data is not stored in the SD card 120.

If a user has set, using the operation panel 202, that diagnostic data is to be stored in the SD card 120 (S1704: "YES"), time elapsed since the primary controller 201 detected a defined kind of problem with the image forming device 100 is checked (S1705). If the elapsed time since detection of a problem reaches a defined time (for example, 1 minute) (S1706: "YES"), the mechanism controller 200 is prohibited from generating and storing diagnostic data in the SD card 120 (S1708).

When diagnostic data is stored in a ring buffer format and the mechanism controller 200 generates diagnostic data after occurrence of a defined problem in the image forming device 100, if diagnostic data unrelated to the problem continued to be overwritten, the diagnostic data related to the problem would be overwritten, which would make it difficult to analyze the problem. To avoid this outcome, as in the present embodiment, as long as diagnostic data generated after a defined amount of time has elapsed is not stored, diagnostic data related to the problem is not overwritten, and therefore analysis of the problem can be more reliably performed.

If the elapsed time since detection of a problem is within the defined time (S1706: "NO"), the mechanism controller 200 is instructed to generate and store diagnostic data in the SD card 120 (S1707).

[6] Embodiment 6

The image forming device diagnostic system 1 pertaining to Embodiment 6 has largely the same structure as the image forming device diagnostic system 1 pertaining to Embodiment 5, but a difference is that average values Ta of sheet arrival times T are stored in the SD card 120 as diagnostic data.

As illustrated in FIG. 19, the mechanism controller 200 first initializes to 0 both a work variable "count" that stores a number of times the sheet arrival time T is calculated and a work variable "sum" that stores a total value of sheet arrival times T (S1901). Subsequently, when the sheet arrival time T is calculated (S1902: "YES"), a value of the sheet arrival time T calculated is added to the work variable "sum" (S1903), and the work variable "count" is incremented (S1904).

If the value of the work variable "count" after incrementing is less than 50 (S1905: "NO"), processing returns to step S1902. If the value of the work variable "count" reaches 50 (S1905: "YES"), the value of the work variable "sum" is divided by 50 to calculate the average value Ta (S1906), and the average value Ta is transmitted from the mechanism controller 200 to the primary controller 201 (S1907). Upon receiving the average value Ta from the mechanism controller 200, the primary controller 201 stores the average value Ta in the SD card 120 (S1908).

FIG. 20A is a table illustrating sheet arrival times T and an average value Ta calculated by the mechanism controller 200. As illustrated in FIG. 20A, the mechanism controller 200 calculates the average value Ta by using 50 values of the sheet arrival time T. The average value Ta so calculated is stored in the SD card 120, as illustrated in FIG. 20B.

Of course, the number of values used for an average value is not limited to 50, and an average value of a number of values other than 50 may be calculated and stored in the SD card 120.

In this way, the mechanism controller 200 transmits the average value Ta from the mechanism controller 200 to the primary controller 201 only once for every 50 calculations of the sheet arrival time T by the mechanism controller 200, and therefore a communication load between the mechanism controller 200 and the primary controller 201 can be reduced.

[7] Embodiment 7

The image forming device diagnostic system 1 pertaining to Embodiment 7 has largely the same structure as the image forming device diagnostic system 1 pertaining to Embodiment 5, but a difference is that a maximum value Tmax of sheet arrival times T are stored in the SD card 120 as diagnostic data.

Figure 21:
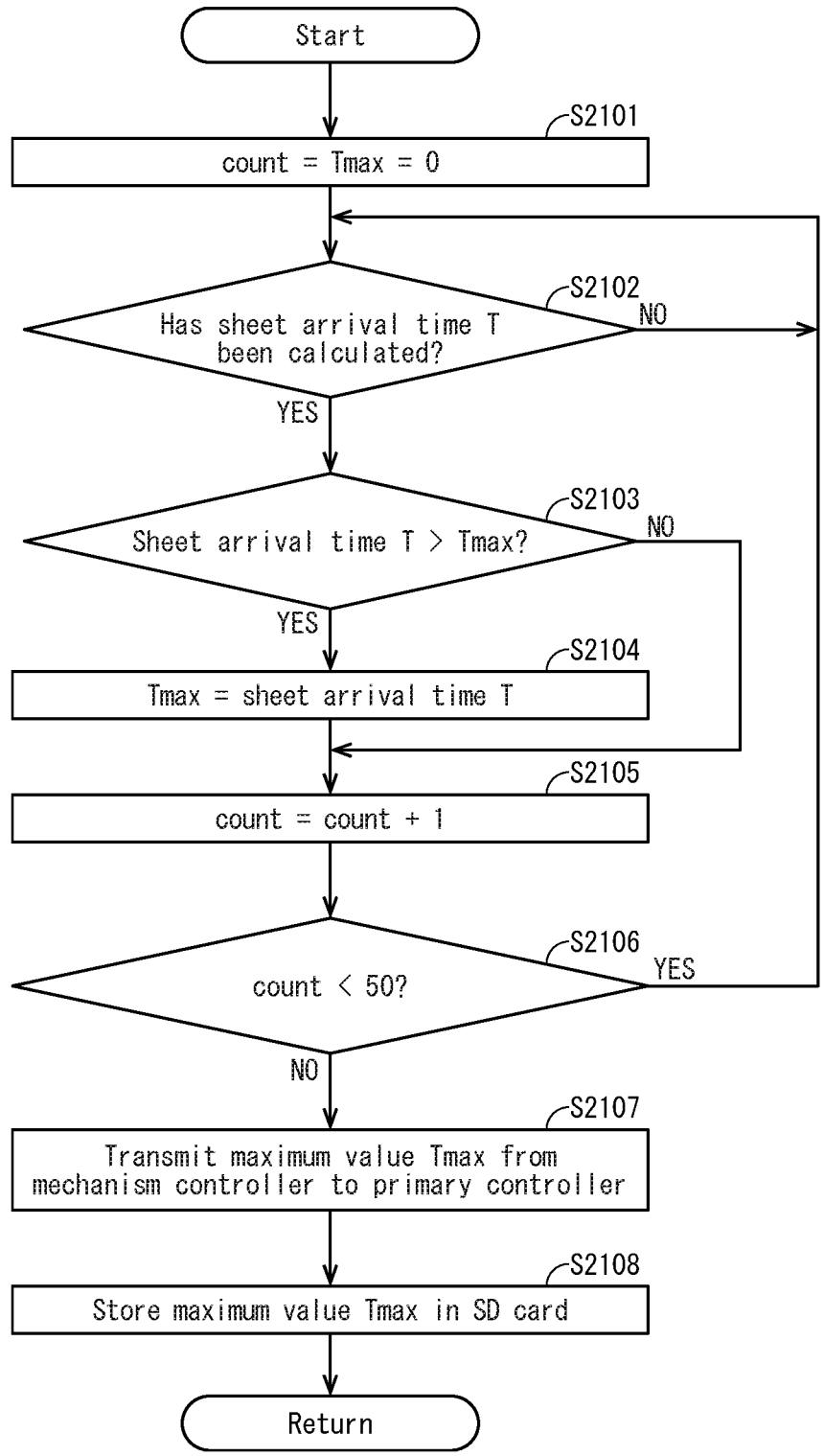
FIG. 21 is a flowchart for describing operations of the mechanism controller 100 pertaining to Embodiment 7.

As illustrated in FIG. 21, the mechanism controller 200 first initializes to 0 both a work variable "count" that stores a number of times the sheet arrival time T is calculated and a work variable "Tmax" that stores a maximum value of sheet arrival times T (S2101). Subsequently, when the sheet arrival time T is calculated (S2102: "YES"), a value of the sheet arrival time T calculated is compared to the work variable "Tmax" (S2103).

If a newly calculated value of the sheet arrival time T is larger than the value of the work variable "Tmax" (S2103: "YES"), the newly calculated value of the sheet arrival time T becomes the value of the work variable "Tmax" (S2104). After step S2104, or if the newly calculated value of the sheet arrival time T is less than or equal to the value of the work variable "Tmax" (S2103: "NO"), the work variable "count" is incremented (S2105).

If the value of the work variable "count" after incrementing is less than 50 (S2106: "YES"), processing returns to step S2102. If the value of the work variable "count" reaches 50 (S2106: "NO"), the value of the work variable "Tmax" is transmitted from the mechanism controller 200 to the primary controller 201 as the maximum value Tmax (S2107). Upon receiving the maximum value Tmax from the mechanism controller 200, the primary controller 201 stores the maximum value Tmax in the SD card 120 (S2108).

FIG. 22A is a table illustrating sheet arrival times T and a maximum value Tmax calculated by the mechanism controller 200. As illustrated in FIG. 22A, the mechanism controller 200 calculates the maximum value Tmax by using 50 values of the sheet arrival time T. The maximum value Tmax so calculated is stored in the SD card 120, as illustrated in FIG. 22B.

Of course, the number of values used for a maximum value is not limited to 50, and a maximum value from a number of values other than 50 may be determined and stored in the SD card 120.

In this way, the mechanism controller 200 transmits the maximum value Tmax from the mechanism controller 200 to the primary controller 201 only once for every 50 calculations of the sheet arrival time T by the mechanism controller 200, and therefore a communication load between the mechanism controller 200 and the primary controller 201 can be reduced.

[8] Embodiment 8

Figure 23:
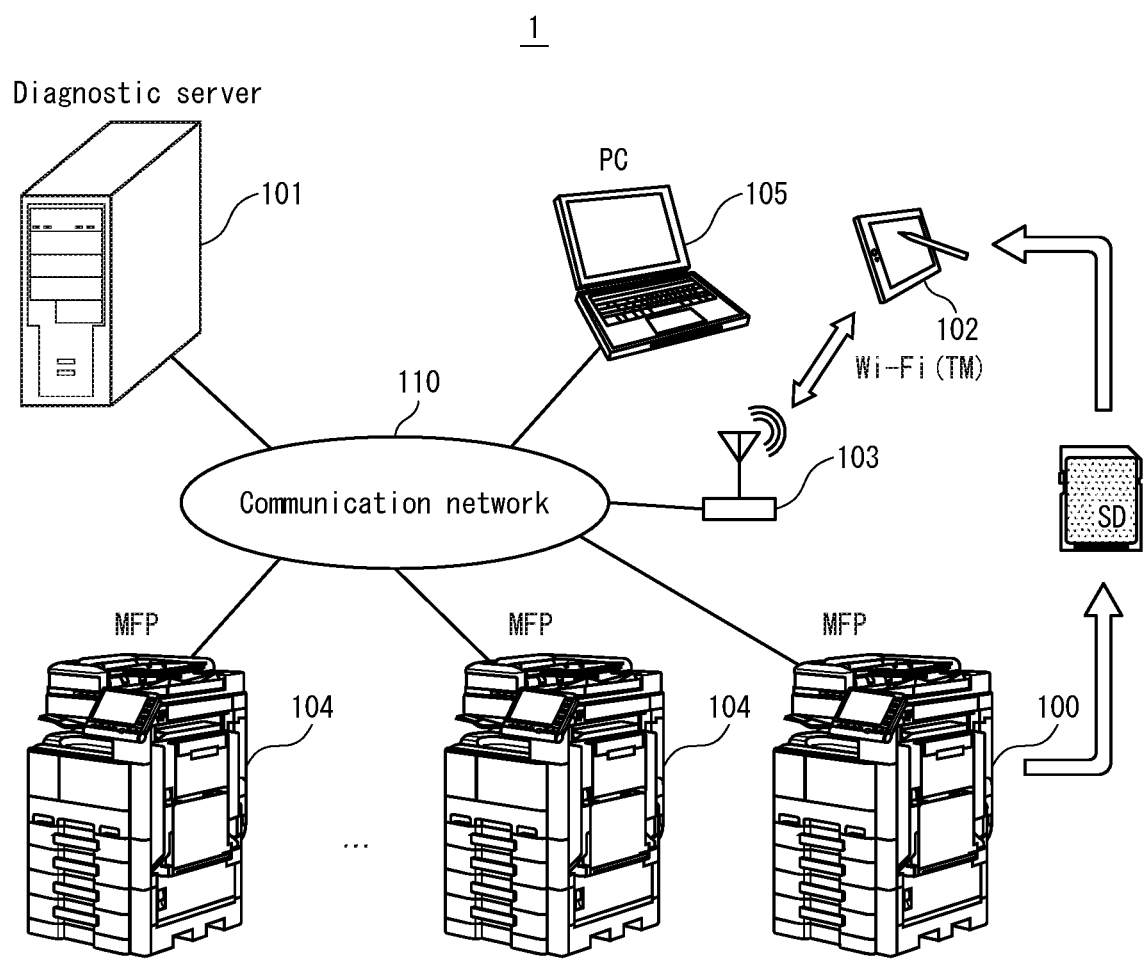
FIG. 23 is a diagram illustrating a structure of the image forming device diagnostic system 1 according to Embodiment 8.

The image forming device diagnostic system 1 pertaining to Embodiment 8 has a structure largely the same as that of the image forming device diagnostic system 1 pertaining to Embodiment 1, but as illustrated in FIG. 23, the image forming device 100 is connected to the communication network 110, and diagnostic data can be transmitted from the image forming device 100 to the diagnostic server 101 via the communication network 110.

Figure 24:
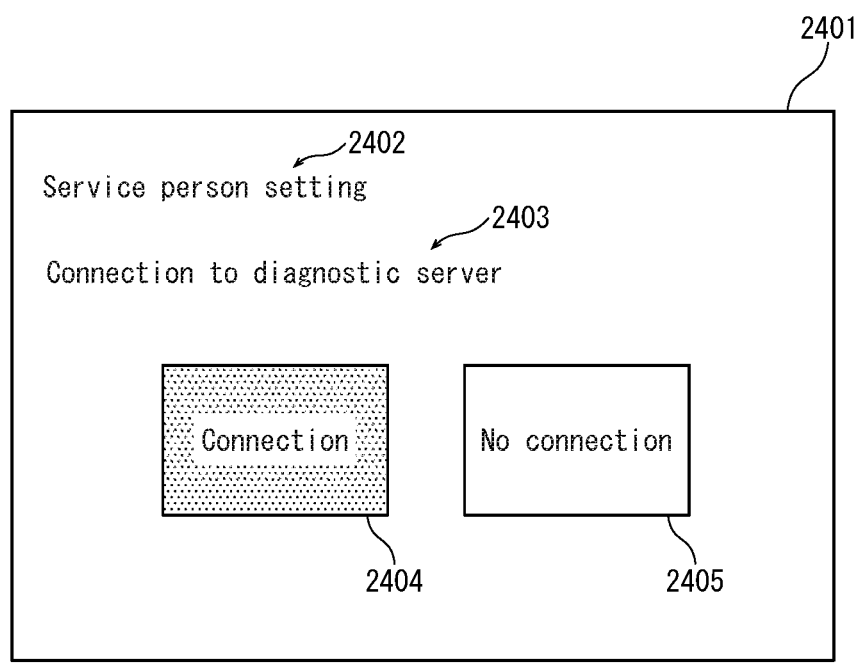
FIG. 24 illustrates a setting screen displayed on the operation panel 202 for setting whether to connect to the diagnostic server 101 via a network.

The image forming device 100 displays a setting screen 2401 illustrated in FIG. 24 on the touch panel of the operation panel 202 to accept setting of whether or not the diagnostic server 101 is connected to the network. The setting screen 2401 includes a display 2402 indicating the authority of a service person is required for the setting, a display 2403 indicating that the screen is for setting connection of the diagnostic server 101, a touch button 2404 for enabling network connection with the diagnostic server 101, and a touch button 2405 for prohibiting network connection with the diagnostic server 101.

When a user touches the touch button 2404, the image forming device 100 connects to the diagnostic server 101 via the communication network 110 so that diagnostic data can be transmitted thereto, by connecting the LAN interface 318 of the primary controller 201 to the communication network 110. On the other hand, when a user touches the touch button 2405, the image forming device 100 stores diagnostic data in the SD card 120.

When the image forming device 100 transmits diagnostic data to the diagnostic server 101 via the communication network 110, there is a risk that a communication load between the mechanism controller 200 and the primary controller 201, and a diagnostic data processing load of the primary controller 201 may become too large. In order to reduce such a communication load or processing load, it is preferable that the average value Ta as in Embodiment 6 or the maximum value Tmax as in Embodiment 7 be used as diagnostic data.

On the other hand, when diagnostic data is stored in the SD card 120, the communication load and processing load do not occur, and therefore in consideration of improvement in accuracy of failure diagnostics and life prediction of the diagnostic server 101, it is preferable to store the sheet arrival times T as diagnostic data in the SD card 120, and not the average value Ta or the maximum value Tmax.

Accordingly, on the setting screen 2401, it is preferable that when the touch button 2404 is touched, an average value or maximum value is obtained for compressed diagnostic data that is transmitted to the diagnostic server 101, and when the touch button 2405 is touched, diagnostic data is not compressed and is stored in the SD card 120.

Note that FIG. 20 and FIG. 22 should be referred to for examples of diagnostic data when compressed. Further, diagnostic data when not compressed is as illustrated in FIG. 7.

Figure 25:
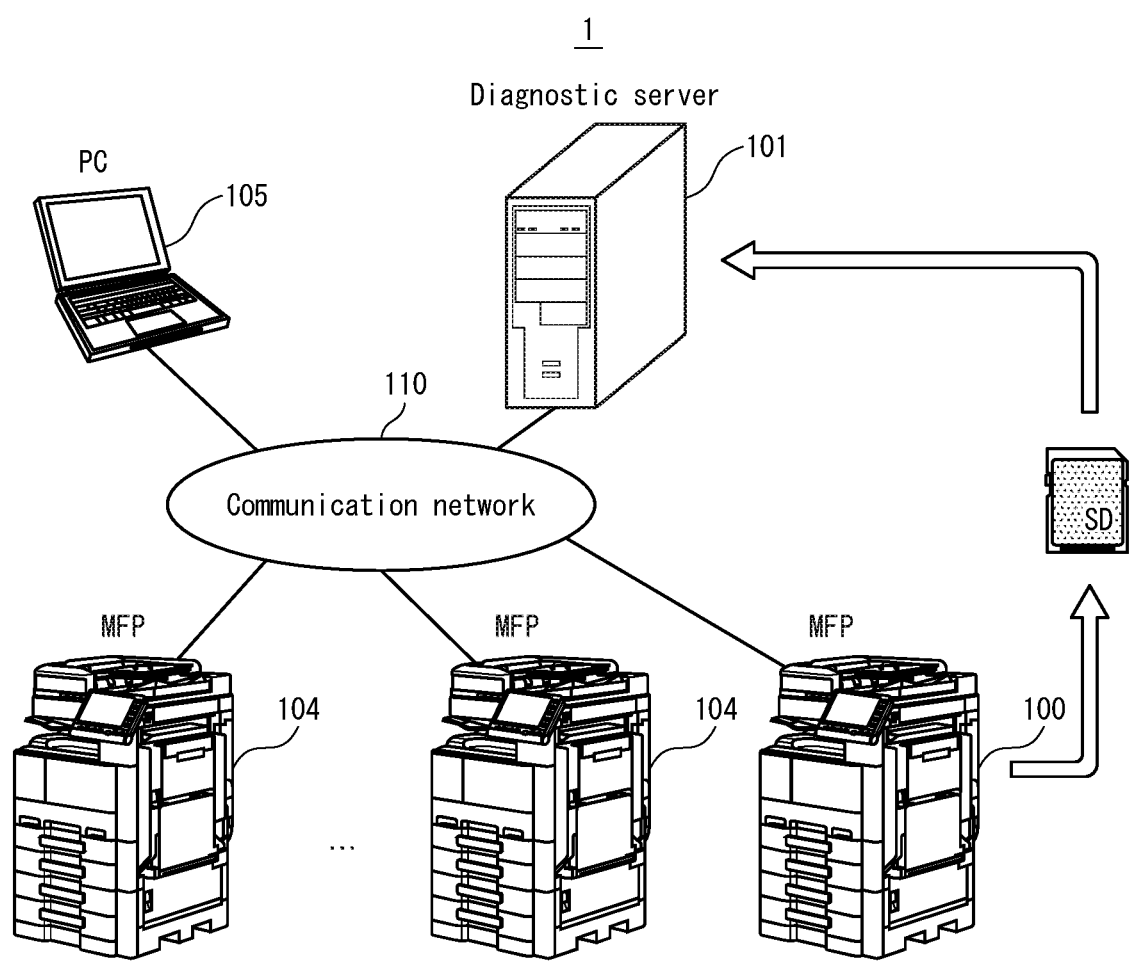
FIG. 25 is a diagram illustrating a structure of the image forming device diagnostic system 1 according to Embodiment 8.

Further, in a case where a service person can easily access both the image forming device 100 and the diagnostic server 101, such as when the diagnostic server 101 and the image forming device 100 are installed in the same premises, the diagnostic data may be transferred from the SD card 120 to the diagnostic server 101 by mounting the SD card 120 to the diagnostic server 101, as illustrated in FIG. 25.

In this case, the diagnostic server 101 does of course require an SD interface, but the SD interface may be part of the diagnostic server 101 or external to the diagnostic server 101. Further, a service person may bring an SD interface that can be attached to a USB port of the diagnostic server 101, and mount the SD card 120 to the SD interface to transfer the diagnostic data.

[9] Embodiment 9

The image forming device diagnostic system 1 pertaining to Embodiment 9 has largely the same structure as the image forming device diagnostic system 1 pertaining to Embodiment 8, but when transmitting compressed diagnostic data to the diagnostic server 101 via the communication network 110, uncompressed diagnostic data is also stored in the SD card 120.

In this case, the image forming device 100 generates and stores ID data indicating correspondence between diagnostic data transmitted to the diagnostic server 101 and diagnostic data stores in the SD card 120.

For example, as illustrated in FIG. 26A, when the sheet arrival time T is stored in the SD card 120 each time the sheet arrival time T is generated, and the average values Ta of every 50 sheet arrival times T are transmitted to the diagnostic server 101, an ID indicating correspondence between 50 of the sheet arrival times T and the corresponding one of the average values Ta is assigned to each of the sheet arrival times T and the average values Ta.

FIG. 26B illustrates an example of diagnostic data stored in the SD card 120. In this example, the sheet arrival time T, the number of sheet arrival times T used for calculation of an average value, and an ID are stored in the SD card 120. The average value Ta is not sought, and the sheet arrival times T are stored as is, and therefore the number of values used for an "average" is 1.

FIG. 26C illustrates an example of diagnostic data transmitted to the diagnostic server 101. In this example, an average value of the sheet arrival times T, the number of sheet arrival times T used for calculation of an average value, and an ID are transmitted to the diagnostic server 101. An example is illustrated in which 50 of the sheet arrival times T are used to obtain the average value Ta, and therefore the number of values used for the average is 50.

By assigning IDs as described above, correspondence between diagnostic data stored in the SD card 120 and diagnostic data transmitted to the diagnostic server 101 can be recorded as illustrated in FIG. 26D.

In this way, when the image forming device 100 is not connected to the communication network 110, the same effects as those of Embodiment 1 can be obtained. Further, when the image forming device 100 is connected to the communication network 110, in addition to effects similar to those of Embodiment 8, the sheet arrival time T for each sheet S is stored in the SD card 120, and therefore when a service person is called to the image forming device 100, an unexpected change in the sheet arrival time T that could be overlooked based on only the average value Ta transmitted to the diagnostic server 101 can be checked. Thus, accurate failure diagnostics and life prediction can be performed.

Diagnostic data may be generated while the SD card 120 is not mounted to the image forming device 100. In this case, the diagnostic data may be temporarily stored in the HDD 314 or the like, and transferred to the SD card 120 when mounted.

[10] Modifications

Although the present disclosure describes various embodiments, the present disclosure is of course not limited to the embodiments described above, and includes the following modifications.

(10-1) According to at least one embodiment, primarily the sheet arrival time T is used as the diagnostic data, but the present disclosure is of course not limited to this, and the following examples of data may be used instead or in addition to such diagnostic data.

For example, photoconductor current values may be used as diagnostic data. Photoconductor current is electric current flowing from the photosensitive drum 511 to an earth when potential of the charged photosensitive drum 511 is attenuated by exposure to light. When a film thickness d of the photosensitive drum 511 becomes smaller, an electrostatic capacity C of the photosensitive drum 511 becomes correspondingly larger, and therefore the photoconductor current becomes larger.

Focusing on this point, if the mechanism controller 200 measures photoconductor current using a photoconductor current monitor and sends information indicating the photoconductor current to the diagnostic server 101, the diagnostic server 101 can estimate film thickness of the photoconductor, and therefore life of the photosensitive drum 511 can be predicted. When measuring photoconductor current, photoconductor current may be measured at a plurality of positions (for example, 10 points) on the circumferential surface of the photosensitive drum 511, and all measured values may be transmitted to the diagnostic server 101.

Further, a drive current value of the fixing motor 526 may be used as diagnostic data. When the surface of the fixing roller 512 deteriorates, torque required for driving rotation of the fixing roller 512 increases, and therefore the drive current value of the fixing motor 526 increases. Thus, the mechanism controller 200 may transmit a drive current value of the fixing motor 526 to the diagnostic server 101, and the diagnostic server 101 may perform failure diagnostics and life prediction for the fixing roller 512.

Drive current value of the fixing motor 526 changes when a sheet passes through and when temperature of the fixing motor 512 changes, and therefore it is preferable to measure 10 times under defined conditions (a measurement mode), and to transmit all 10 measurements to the diagnostic server 101.

Further, the mechanism controller 200, when performing image stabilizing processing or the like, may form a defined toner patch on the intermediate transfer belt 510 and, using an image density control (IDC) sensor, measure density of the toner patch at 10 points, for example, and transmit all 10 measurements to the diagnostic server 101. The diagnostic server 101 can perform failure diagnosis and life prediction of the intermediate transfer belt 510, the primary transfer roller 904, the photosensitive drum 511, and the like, by referring to the diagnostic data.

Further, the mechanism controller 200 may use a transfer voltage monitor to measure secondary transfer voltage under defined measurement conditions, at 10 points, for example, and transmit voltage values for all 10 points to the diagnostic server 101. By referencing the secondary transfer voltage, the diagnostic server 101 can perform failure diagnosis and life prediction for the secondary transfer roller 507 and the intermediate transfer belt 510.

(10-2) Although not specifically mentioned above, the diagnostic server 101 may be a computer, and may be a cloud server. In any case, the application of the disclosure can obtain the described effects.

(10-3) According to at least one embodiment, the image forming device 100 is a tandem-type color MFP, but of course the present disclosure is not limited to this example. The image forming device may be a color MFP other than a tandem-type device, and may be a monochrome MFP. Further, the effects of the present disclosure are obtained when applied to a single-function device such a printer, copy machine, or facsimile device.

[11] Review

In review, an embodiment of the present disclosure is an image forming device including an image former, a primary controller, a secondary controller, one or more sensors, an interface, and a writer. The image former executes image forming processing to form an image on a sheet. The primary controller instructs the secondary controller to control the image former to execute the image forming processing. Each sensor of the one or more sensors detects a state of the image former and outputs sensor data indicating the state to the secondary controller. The interface can be connected to a storage medium. The secondary controller generates diagnostic data based on the sensor data. The writer writes the diagnostic data to the storage medium when the storage medium is connected to the interface. The diagnostic data is used by a diagnostic server to perform failure diagnostics and life prediction pertaining to the image forming device, after transfer to the diagnostic server via a transfer device when the storage medium is mounted to the transfer device.

According to Japanese Patent Publication No. 2006-30258, two separate communication paths are provided between an image forming apparatus and a plurality of finishing apparatuses. Similarly, according to Japanese Patent Application Publication No. 2018-92593, two separate communication paths are provided between a main device and a control device in an information processing apparatus. Unlike these conventional structures, failure diagnostics and life prediction can be performed by using a diagnostic server even if an image forming device is not connected via a network to the diagnostic server, because diagnostic data can be transferred to the diagnostic server by using a storage medium.

According to at least one embodiment, the writer includes a storage that stores the diagnostic data sequentially, and when the storage medium is connected to the interface, the writer writes the stored diagnostic data to the storage medium sequentially.

According to at least one embodiment, the image forming device further includes a storage prohibitor that can prohibit the storing of the diagnostic data in the storage of the writer.

According to at least one embodiment, when an amount of the diagnostic data stored in the storage of the writer reaches a defined upper limit, the writer overwrites an oldest entry of the stored diagnostic data with a newest entry of the diagnostic data, the writer further includes an event judgment unit that determines whether a defined event occurred in the image forming device, and the storage prohibitor prohibits the storing of the diagnostic data in the storage of the writer when a defined time has elapsed from the event judgment unit determining that the defined event has occurred.

According to at least one embodiment, the writer stores the diagnostic data in an uncompressed state.

According to at least one embodiment, the image forming device further includes a compression unit that compresses the diagnostic data generated by the secondary controller, and the writer stores the diagnostic data in a compressed state.

According to at least one embodiment, the writer writes the diagnostic data to the storage medium sequentially when the storage medium is connected to the interface and not mounted to the transfer device.

According to at least one embodiment, the image forming device further includes a writing prohibitor that prohibits the writer from writing the diagnostic data under a defined condition.

According to at least one embodiment, when an amount of the diagnostic data stored in the storage medium reaches a defined upper limit, the writer overwrites an oldest entry of the stored diagnostic data with a newest entry of the diagnostic data. The image forming device further includes an event judgment unit that determines whether a defined event occurred in the image forming device, and a writing prohibitor that prohibits the writer from writing the diagnostic data to the storage medium when a defined time has elapsed from the event judgment unit determining that the defined event has occurred.

According to at least one embodiment, the writer writes the diagnostic data to the storage medium in an uncompressed state.

According to at least one embodiment, the image forming device further includes a compression unit that compresses the diagnostic data generated by the secondary controller, and the writer writes the diagnostic data to the storage medium in a compressed state.

According to at least one embodiment, the writer writes the diagnostic data to the storage medium via the interface, relayed through the primary controller.

According to at least one embodiment, the writer writes the diagnostic data to the storage medium via the interface without relaying through the primary controller.

According to at least one embodiment, the writer writes the diagnostic data to the storage medium in a first format and the diagnostic server executes failure diagnostics and life prediction by using the diagnostic data in the first format.

According to at least one embodiment, the writer writes the diagnostic data to the storage medium in a data format that can be converted to a first format and the diagnostic server executes failure diagnostics and life prediction by using the diagnostic data in the first format.

According to at least one embodiment, the image forming device further includes a diagnostic data transmitter that transmits the diagnostic data to the diagnostic server, and a transmission prohibitor that prohibits the transmission of the diagnostic data by the diagnostic data transmitter under a defined condition.

According to at least one embodiment, the image forming device further includes a compression unit that compresses the diagnostic data generated by the secondary controller, and a diagnostic data transmitter that transmits the diagnostic data in a compressed state to the diagnostic server. Further, the writer stores, in addition to the diagnostic data, data indicating a correspondence between the diagnostic data in the compressed state and the diagnostic data in an uncompressed state.

According to at least one embodiment, the image forming device further includes a compression unit that compresses the diagnostic data generated by the secondary controller, a diagnostic data transmitter that transmits the diagnostic data in a compressed state to the diagnostic server. Further, the writer writes to the storage medium, in addition to the diagnostic data in the uncompressed state, data indicating a correspondence between the diagnostic data in the compressed state and the diagnostic data in the uncompressed state.

According to at least one embodiment, the compression unit calculates, as the diagnostic data in the compressed state, at least one of an average value, a maximum value, and a minimum value of values of the diagnostic data generated by the secondary controller within a defined time period.

According to at least one embodiment, the image former includes a sheet feed tray that stores the sheet used in the image forming, and a sheet feed roller that feeds the sheet from the sheet feed tray. Further, the one or more sensors include a sheet arrival time detector that detects a sheet arrival time, which is a time taken by the sheet to be conveyed from a first position downstream in a sheet conveyance direction from the sheet feed roller to a second position downstream in the sheet conveyance direction from the first position, and the diagnostic data includes the sheet arrival time.

According to at least one embodiment, the image former includes a photoreceptor for forming a toner image by electrophotography, the one or more sensors include a surface state sensor that detects a surface state of the photoreceptor, and the diagnostic data includes an output value from the surface state sensor.

According to at least one embodiment, the image former includes a rotation member used in image forming, and a drive motor that drives rotation of the rotation member. Further, the one or more sensors include a torque sensor that detects data indicating torque of the drive motor, and the diagnostic data includes the data output by the torque sensor.

According to at least one embodiment, the image former is a tandem-type printer comprising an intermediate transfer belt that conveys a toner image transferred thereon to a secondary transfer position. Further, the one or more sensors include an attachment amount sensor that detects an amount of toner carried on the intermediate transfer belt, and the diagnostic data includes the amount of toner carried.

According to at least one embodiment, the image former includes a transfer unit for electrostatic transfer of a toner image onto the sheet, the one or more sensors include a voltage detector that detects a transfer voltage for the electrostatic transfer, and the diagnostic data includes the transfer voltage.

Another aspect of the present disclosure is an image forming device diagnostic system including an image forming device, a transfer device, and a diagnostic server. The image forming device includes an image former, a primary controller, a secondary controller, one or more sensors, an interface, and a writer. The image former executes image forming processing to form an image on a sheet. The primary controller instructs the secondary controller to control the image former to execute the image forming processing. Each sensor of the one or more sensors detects a state of the image former and outputs sensor data indicating the state to the secondary controller. The interface can be connected to a storage medium. The secondary controller generates diagnostic data based on the sensor data. The writer writes the diagnostic data to the storage medium when the storage medium is connected to the interface. The storage medium can be mounted to the transfer device. The diagnostic data is used by the diagnostic server to perform failure diagnostics and life prediction pertaining to the image forming device, after transfer to the diagnostic server via the transfer device when the storage medium is mounted to the transfer device.

Although embodiments of the present invention have been described and illustrated in detail, the disclosed embodiments are made for purposes of illustration and example only and not limitation. The scope of the present invention should be interpreted by terms of the appended claims.

What is claimed is:

1. An image forming device comprising:
an image former that executes image forming processing to form an image on a sheet;
a primary controller and a secondary controller, the primary controller instructing the secondary controller to control the image former to execute the image forming processing;
one or more sensors, each sensor detecting a state of the image former and outputting sensor data indicating the state to the secondary controller;
an interface to which a storage medium can be connected; and
a writer that includes a storage that stores the diagnostic data sequentially, and when the storage medium is connected to the interface, the writer writes the stored diagnostic data to the storage medium sequentially, wherein
when an amount of the diagnostic data stored in the storage of the writer reaches a defined upper limit, the writer overwrites an oldest entry of the stored diagnostic data with a newest entry of the diagnostic data, the writer further comprising
an event judgment unit that determines whether a defined event occurred in the image forming device,
wherein the image forming device further comprises:
a storage prohibitor that prohibits the storing of the diagnostic data in the storage of the writer when a defined time has elapsed from the event judgment unit determining that the defined event has occurred, wherein
the secondary controller generates diagnostic data based on the sensor data,
the writer writes the diagnostic data to the storage medium when the storage medium is connected to the interface, and
the diagnostic data is used by a diagnostic server to perform failure diagnostics and life prediction pertaining to the image forming device, after transfer to the diagnostic server via a transfer device when the storage medium is mounted to the transfer device.

2. The image forming device of claim 1, wherein the writer stores the diagnostic data in an uncompressed state.

3. The image forming device of claim 1, further comprising
a compression unit that compresses the diagnostic data generated by the secondary controller, wherein
the writer stores the diagnostic data in a compressed state.

4. The image forming device of claim 3, wherein
the compression unit calculates, as the diagnostic data in the compressed state, at least one of an average value, a maximum value, and a minimum value of values of the diagnostic data generated by the secondary controller within a defined time period.

5. The image forming device of claim 1, wherein
the writer writes the diagnostic data to the storage medium sequentially when the storage medium is connected to the interface and not mounted to the transfer device.

6. The image forming device of claim 1, further comprising
a writing prohibitor that prohibits the writer from writing the diagnostic data under a defined condition.

7. The image forming device of claim 1, wherein
the writer writes the diagnostic data to the storage medium in an uncompressed state.

8. The image forming device of claim 7, further comprising:
a compression unit that compresses the diagnostic data generated by the secondary controller; and
a diagnostic data transmitter that transmits the diagnostic data in a compressed state to the diagnostic server, wherein
the writer writes to the storage medium, in addition to the diagnostic data in the uncompressed state, data indicating a correspondence between the diagnostic data in the compressed state and the diagnostic data in the uncompressed state.

9. The image forming device of claim 1, further comprising
a compression unit that compresses the diagnostic data generated by the secondary controller, wherein
the writer writes the diagnostic data to the storage medium in a compressed state.

10. The image forming device of claim 1, wherein
the writer writes the diagnostic data to the storage medium via the interface, relayed through the primary controller.

11. The image forming device of claim 1, wherein
the writer writes the diagnostic data to the storage medium via the interface without relaying through the primary controller.

12. The image forming device of claim 1, wherein
the writer writes the diagnostic data to the storage medium in a first format and the diagnostic server executes failure diagnostics and life prediction by using the diagnostic data in the first format.

13. The image forming device of claim 1, wherein
the writer writes the diagnostic data to the storage medium in a data format that can be converted to a first format and the diagnostic server executes failure diagnostics and life prediction by using the diagnostic data in the first format.

14. The image forming device of claim 1, further comprising:
a diagnostic data transmitter that transmits the diagnostic data to the diagnostic server; and
a transmission prohibitor that prohibits the transmission of the diagnostic data by the diagnostic data transmitter under a defined condition.

15. The image forming device of claim 1, further comprising:
a compression unit that compresses the diagnostic data generated by the secondary controller; and
a diagnostic data transmitter that transmits the diagnostic data in a compressed state to the diagnostic server, wherein
the writer stores, in addition to the diagnostic data, data indicating a correspondence between the diagnostic data in the compressed state and the diagnostic data in an uncompressed state.

16. The image forming device of claim 1, wherein
the image former comprises:
a sheet feed tray that stores the sheet used in the image forming; and
a sheet feed roller that feeds the sheet from the sheet feed tray, wherein
the one or more sensors include a sheet arrival time detector that detects a sheet arrival time, which is a time taken by the sheet to be conveyed from a first position downstream in a sheet conveyance direction from the sheet feed roller to a second position downstream in the sheet conveyance direction from the first position, and
the diagnostic data includes the sheet arrival time.

17. The image forming device of claim 1, wherein
the image former comprises a photoreceptor for forming a toner image by electrophotography, wherein
the one or more sensors include a surface state sensor that detects a surface state of the photoreceptor, and
the diagnostic data includes an output value from the surface state sensor.

18. The image forming device of claim 1, wherein
the image former comprises:
a rotation member used in image forming; and
a drive motor that drives rotation of the rotation member, wherein
the one or more sensors include a torque sensor that detects data indicating torque of the drive motor, and
the diagnostic data includes the data output by the torque sensor.

19. The image forming device of claim 1, wherein
the image former is a tandem-type printer comprising an intermediate transfer belt that conveys a toner image transferred thereon to a secondary transfer position, wherein
the one or more sensors include an attachment amount sensor that detects an amount of toner carried on the intermediate transfer belt, and
the diagnostic data includes the amount of toner carried.

20. The image forming device of claim 1, wherein
the image former comprises a transfer unit for electrostatic transfer of a toner image onto the sheet, wherein
the one or more sensors include a voltage detector that detects a transfer voltage for the electrostatic transfer, and
the diagnostic data includes the transfer voltage.

21. An image forming device comprising:
an image former that executes image forming processing to form an image on a sheet;
a primary controller and a secondary controller, the primary controller instructing the secondary controller to control the image former to execute the image forming processing;
one or more sensors, each sensor detecting a state of the image former and outputting sensor data indicating the state to the secondary controller;
an interface to which a storage medium can be connected; and
a writer, wherein
the secondary controller generates diagnostic data based on the sensor data,
the writer writes the diagnostic data to the storage medium when the storage medium is connected to the interface, and
the diagnostic data is used by a diagnostic server to perform failure diagnostics and life prediction pertaining to the image forming device, after transfer to the diagnostic server via a transfer device when the storage medium is mounted to the transfer device; wherein
when an amount of the diagnostic data stored in the storage medium reaches a defined upper limit, the writer overwrites an oldest entry of the stored diagnostic data with a newest entry of the diagnostic data, the image forming device further comprising:
an event judgment unit that determines whether a defined event occurred in the image forming device; and
a writing prohibitor that prohibits the writer from writing the diagnostic data to the storage medium when a defined time has elapsed from the event judgment unit determining that the defined event has occurred.

22. An image forming device diagnostic system comprising:
an image forming device comprising:
an image former that executes image forming processing to form an image on a sheet;
a primary controller and a secondary controller, the primary controller instructing the secondary controller to control the image former to execute the image forming processing;

one or more sensors, each sensor detecting a state of the image former and outputting sensor data indicating the state to the secondary controller;

an interface to which a storage medium can be connected; and a writer;

the image forming device diagnostic system further comprising:

a transfer device to which the storage medium can be mounted; and a diagnostic server, wherein the secondary controller generates diagnostic data based on the sensor data, the writer writes the diagnostic data to the storage medium when the storage medium is connected to the interface, and the diagnostic data is used by the diagnostic server to perform failure diagnostics and life prediction pertaining to the image forming device, after transfer to the diagnostic server via the transfer device when the storage medium is mounted to the transfer device; wherein when an amount of the diagnostic data stored in the storage medium reaches a defined upper limit, the writer overwrites an oldest entry of the stored diagnostic data with a newest entry of the diagnostic data, the image forming device further comprising:

an event judgment unit that determines whether a defined event occurred in the image forming device; and a writing prohibitor that prohibits the writer from writing the diagnostic data to the storage medium when a defined time has elapsed from the event judgment unit determining that the defined event has occurred.

* * * * *